(12) United States Patent
Kobayashi et al.

(10) Patent No.: US 9,217,440 B2
(45) Date of Patent: Dec. 22, 2015

(54) CEILING FAN

(75) Inventors: Kazuyuki Kobayashi, Aichi (JP); Shigeo Itou, Osaka (JP); Hitoshi Nakamichi, Aichi (JP); Hiroyuki Kuramochi, Aichi (JP); Tetsuji Kawazu, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1116 days.

(21) Appl. No.: 13/144,183

(22) PCT Filed: Jan. 21, 2010

(86) PCT No.: PCT/JP2010/000312
§ 371 (c)(1),
(2), (4) Date: Jul. 12, 2011

(87) PCT Pub. No.: WO2010/084749
PCT Pub. Date: Jul. 29, 2010

(65) Prior Publication Data
US 2011/0274561 A1   Nov. 10, 2011

(30) Foreign Application Priority Data

Jan. 23, 2009 (JP) ................................. 2009-012624
Feb. 6, 2009 (JP) ................................. 2009-026111
Apr. 7, 2009 (JP) ................................. 2009-092632

(51) Int. Cl.
*F04D 27/00* (2006.01)
*F04D 25/08* (2006.01)

(52) U.S. Cl.
CPC ............ *F04D 27/004* (2013.01); *F04D 25/088* (2013.01)

(58) Field of Classification Search
CPC .............................. F04D 27/004; F04D 25/088
USPC .................. 417/14, 32, 53; 416/28, 30, 39
See application file for complete search history.

(56) References Cited

U.S. PATENT DOCUMENTS 5,093,891 A * 3/1992 Komiyama et al. ........... 388/813
5,187,472 A * 2/1993 Hart et al. .................... 340/12.5
5,462,407 A * 10/1995 Calvo .......................... 416/132 A
5,528,229 A * 6/1996 Mehta ........................... 340/3.4
(Continued)

FOREIGN PATENT DOCUMENTS

CN          2570505 Y        9/2003
JP          63-1799          1/1988
(Continued)

OTHER PUBLICATIONS

Raw Machine Translation of Chinese Document CN2570505Y, Liu Changming et al., "Ceiling fan with temperature regulating air", Sep. 2003, China.*
(Continued)

*Primary Examiner* — Devon Kramer
*Assistant Examiner* — Lilya Pekarskaya
(74) *Attorney, Agent, or Firm* — Panasonic Patent Center

(57) ABSTRACT

A ceiling fan includes a connecting portion fixed to a ceiling, an electric motor having a rotation shaft disposed on a lower portion of the connecting portion, a temperature detector provided on a lower portion of the electric motor for detecting a peripheral temperature, and a controller for estimating a room temperature based on the temperature detected by the temperature detector and driving the electric motor according to the estimated room temperature.

6 Claims, 27 Drawing Sheets

(56) References Cited

U.S. PATENT DOCUMENTS

| | | | | |
|---|---|---|---|---|
| 5,624,230 | A * | 4/1997 | Taylor et al. | 416/5 |
| 5,996,898 | A * | 12/1999 | Parker et al. | 236/51 |
| 6,189,799 | B1 * | 2/2001 | Parker et al. | 236/51 |
| 6,415,984 | B1 * | 7/2002 | Parker et al. | 236/49.3 |
| 6,631,243 | B2 * | 10/2003 | Reiker | 392/364 |
| 7,340,367 | B2 * | 3/2008 | Inoue et al. | 702/132 |
| 7,450,356 | B2 * | 11/2008 | Ching | 361/33 |
| 2009/0208333 | A1 * | 8/2009 | Smith et al. | 416/5 |

FOREIGN PATENT DOCUMENTS

| | | |
|---|---|---|
| JP | 1-208634 | 8/1989 |
| JP | 5-280490 | 10/1993 |
| JP | 05-280490 | 10/1993 |
| JP | 06-207597 | 7/1994 |
| JP | 6-207597 | 7/1994 |
| JP | 6-288387 | 10/1994 |
| JP | 06-288387 | 10/1994 |
| JP | 10-170176 | 6/1998 |
| JP | 11-294837 | 10/1999 |

OTHER PUBLICATIONS

International Search Report of PCT Application No. PCT/JP2010/000312, dated Feb. 16, 2010.

* cited by examiner

Wind speed storage unit 110 data table example

Wind speed storage unit 110 data table example

CEILING FAN

TECHNICAL FIELD

The present invention relates to a ceiling fan.

BACKGROUND ART

A conventional ceiling fan has the following configuration. That is, the ceiling fan includes a connecting portion fixed to a ceiling, and a ceiling fan body which is suspended from the connecting portion through suspending means. Patent Documents 1 to 3 are exemplary prior art documents of the ceiling fan.

In the conventional ceiling fan, to enhance the degree of comfort, a temperature detector is provided to measure a room temperature, and a rotation speed of the ceiling fan is adjusted in accordance with the room temperature.

The temperature detector is disposed together with an operation switch of the ceiling fan provided on a wall of the room, and the temperature detector can adjust the rotation speed of the ceiling fan.

However, if the temperature detector is provided on the wall, since wiring is required between the ceiling fan and the temperature detector or the ceiling fan includes a wireless remote control, the ceiling fan becomes complicated.

In a region having a dry season, a rain season or a season such as spring, summer, fall and winter, a sensible temperature at which a user feels comfortable differs depending upon the season. A sense of air current also differs depending upon users. Therefore, it is required to grasp using tendencies of users in addition to automatic operation in accordance with a room temperature. Further, a direction of desired air current also differs between spring, summer, fall and winter in some cases.

When the rotation speed of the ceiling fan is changed in accordance with a room temperature, usability is poor in some cases. That is, air current generated when the ceiling fan is operated is less prone to reach a user depending upon an installation place of the temperature detector in some cases. Hence, air is adversely accumulated in the vicinity of the temperature detector, and when the rotation speed is changed in accordance with room temperature, the change in the rotation speed does not follow the change in the room temperature and thus, the usability is poor in some cases.

PRIOR ART DOCUMENT

Patent Document

Patent Document 1: Unexamined Japanese Patent Publication No. H10-170176
Patent Document 2: Unexamined Japanese Patent Publication No. S63-1799
Patent Document 3: Unexamined Japanese Patent Publication No. H01-208634

DISCLOSURE OF THE INVENTION

The present invention provides a ceiling fan including a connecting portion fixed to a ceiling, an electric motor having a rotation shaft disposed on a lower portion of the connecting portion, a temperature detector provided on a lower portion of the electric motor for detecting a peripheral temperature, and a controller for estimating a room temperature based on the temperature detected by the temperature detector and driving the electric motor according to the estimated room temperature.

According to the ceiling fan having the above-described structure, the controller estimates the room temperature based on the temperature detected by the temperature detector to drive the electric motor, and it is possible to adjust the rotation speed in accordance with the room temperature with a simple configuration.

PREFERRED EMBODIMENTS FOR CARRYING OUT OF THE INVENTION

Embodiments of the present invention are described with reference to the drawings.

First Embodiment

Figure 1:
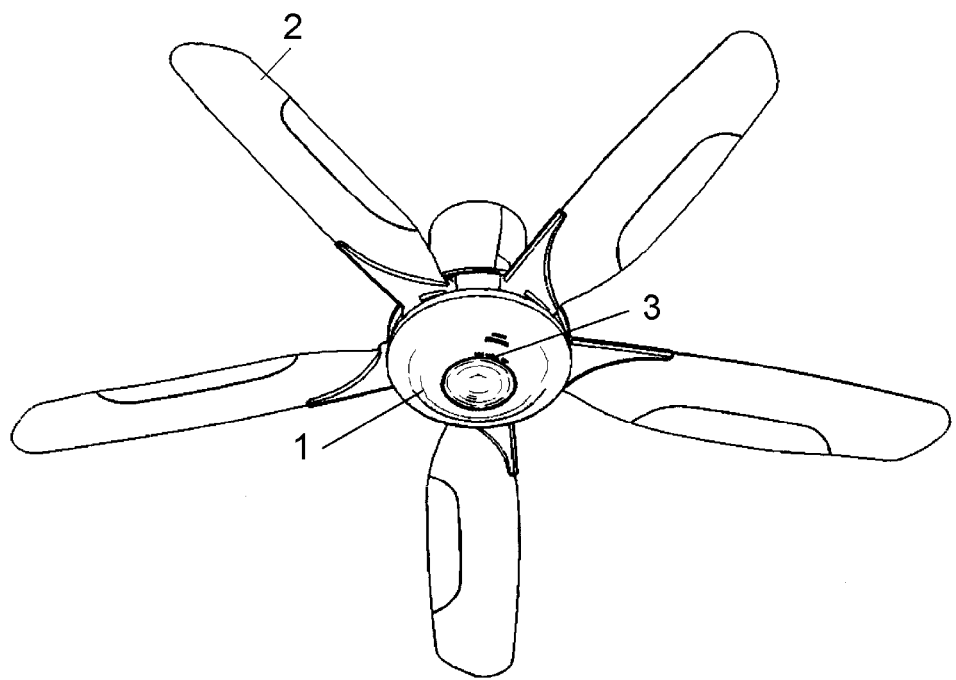
FIG. 1 is a perspective view showing an installation example of a ceiling fan according to a first embodiment of the present invention.

FIG. 1 is a perspective view showing an installation example of a ceiling fan according to a first embodiment of the present invention. As shown in FIG. 1, the ceiling fan is mounted on a ceiling. Ceiling fan body 1 includes five fan blades 2 and electric motor 3 which rotates fan blades 2.

Figure 2:
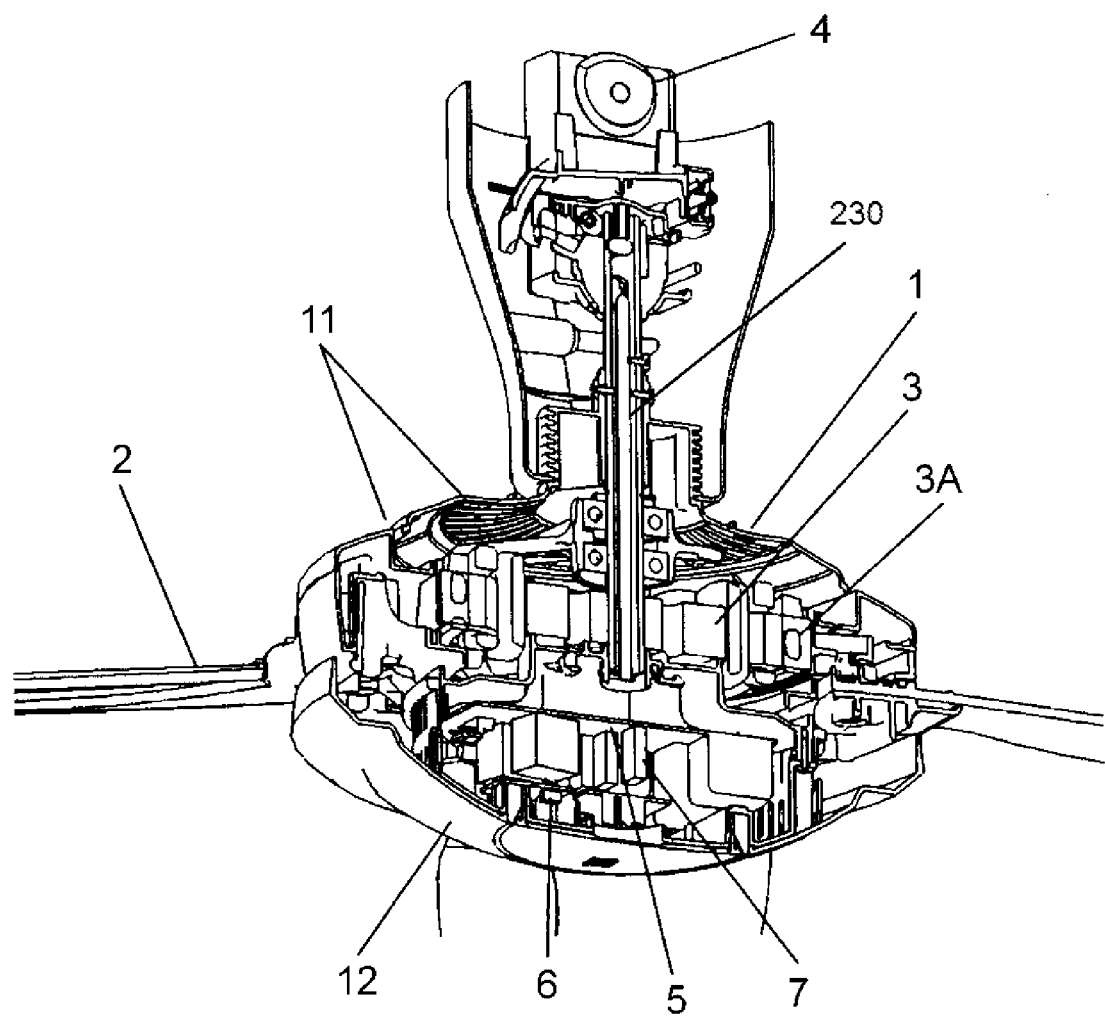
FIG. 2 is a diagram showing a configuration of the ceiling fan.

FIG. 2 is a diagram showing a configuration of the ceiling fan of the first embodiment. As shown in FIG. 2, ceiling fan body 1 includes connecting portion 4, electric motor 3, fan blades 2 and control substrate 5. Connecting portion 4 fixed to the ceiling fixes ceiling fan to the ceiling. Electric motor 3 has an outer rotor shape which is suspended vertically downward from connecting portion 4 and disposed. Fan blades 2 are directly connected to rotor 3A disposed on the side of an outer periphery of electric motor 3. Control substrate 5 is disposed at a location closer to an inner periphery than rotor 3A of electric motor 3.

Temperature detector 6 which detects a peripheral temperature near an outer periphery of electric motor 3, and controller 7 which controls operation of electric motor 3 based on a temperature detected by temperature detector 6 are disposed on control substrate 5.

Figure 3:
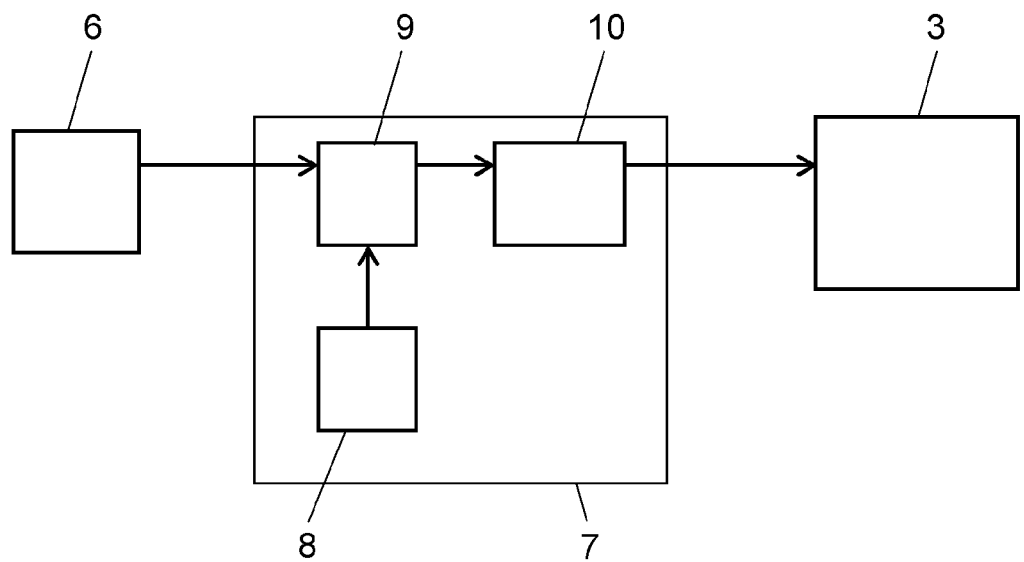
FIG. 3 is a block diagram of a controller of the ceiling fan.

FIG. 3 is a block diagram of the controller of the ceiling fan according to the first embodiment of the present invention. As shown in FIG. 3, controller 7 includes temperature-rise storage unit 8, temperature correcting unit 9 and driving unit 10. Temperature-rise data at the time of operation of electric motor 3 is previously stored in temperature-rise storage unit 8. Temperature correcting unit 9 corrects a temperature detected by temperature detector 6 by data of temperature-rise storage unit 8, and estimates a room temperature. Driving unit 10 determines the number of operation rotations of electric motor 3 from the room temperature estimated by temperature correcting unit 9, and operates electric motor 3.

That is, as shown in FIG. 2, the ceiling fan includes connecting portion 4 fixed to the ceiling, electric motor 3 disposed on a lower portion of connecting portion 4 such that a rotation shaft 230 of electric motor 3 is directed vertically, temperature detector 6 which is disposed on a lower portion of electric motor 3 for detecting a peripheral temperature, and controller 7 which estimates a room temperature by a temperature detected by temperature detector 6 and drives electric motor 3.

Upper cover 11 is provided from an upper side of electric motor 3, and decoration cap 12 is provided from a lower side of electric motor 3 in a manner to entirely cover electric motor 3, rotor 3A and control substrate 5. That is, temperature detector 6 is disposed inside of decoration cap 12.

Temperature correcting unit 9 associates time elapsed after start of operation of electric motor 3, time elapsed after stop of operation and temperature-rise data with each other, and corrects a temperature detected by temperature detector 6. That is, controller 7 includes temperature correcting unit 9 for correcting the temperature detected by temperature detector 6 in accordance with time elapsed after operation of the ceiling fan is started, and which corrects a temperature detected by temperature detector 6 in accordance with time elapsed after operation of the ceiling fan is stopped.

Controller 7 does not start temperature detection for a predetermined time after the stop of operation. Here, the predetermined time is 10 minutes to 15 minutes for example.

In the above-described configuration, if the ceiling fan, i.e., electric motor 3 is operated, since electric motor 3 is disposed inside of upper cover 11 and decoration cap 12, influence of temperature rise of electric motor 3 remarkably appears inside of decoration cap 12.

Figure 4:
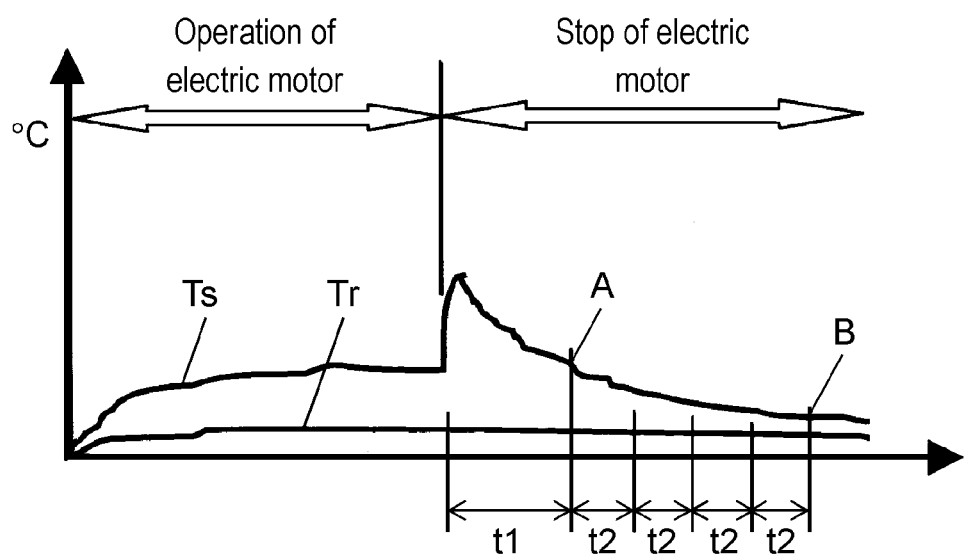
FIG. 4 is a diagram showing a temperature detected by a temperature detector of the ceiling fan.

FIG. 4 is a diagram showing the temperature detected by the temperature detector of the ceiling fan according to the first embodiment of the present invention. Since temperature detector 6 is disposed inside of decoration cap 12, as shown in FIG. 4, detected temperature Ts rises while receiving influence of heat of electric motor 3 with respect to room temperature Tr.

Figure 5:
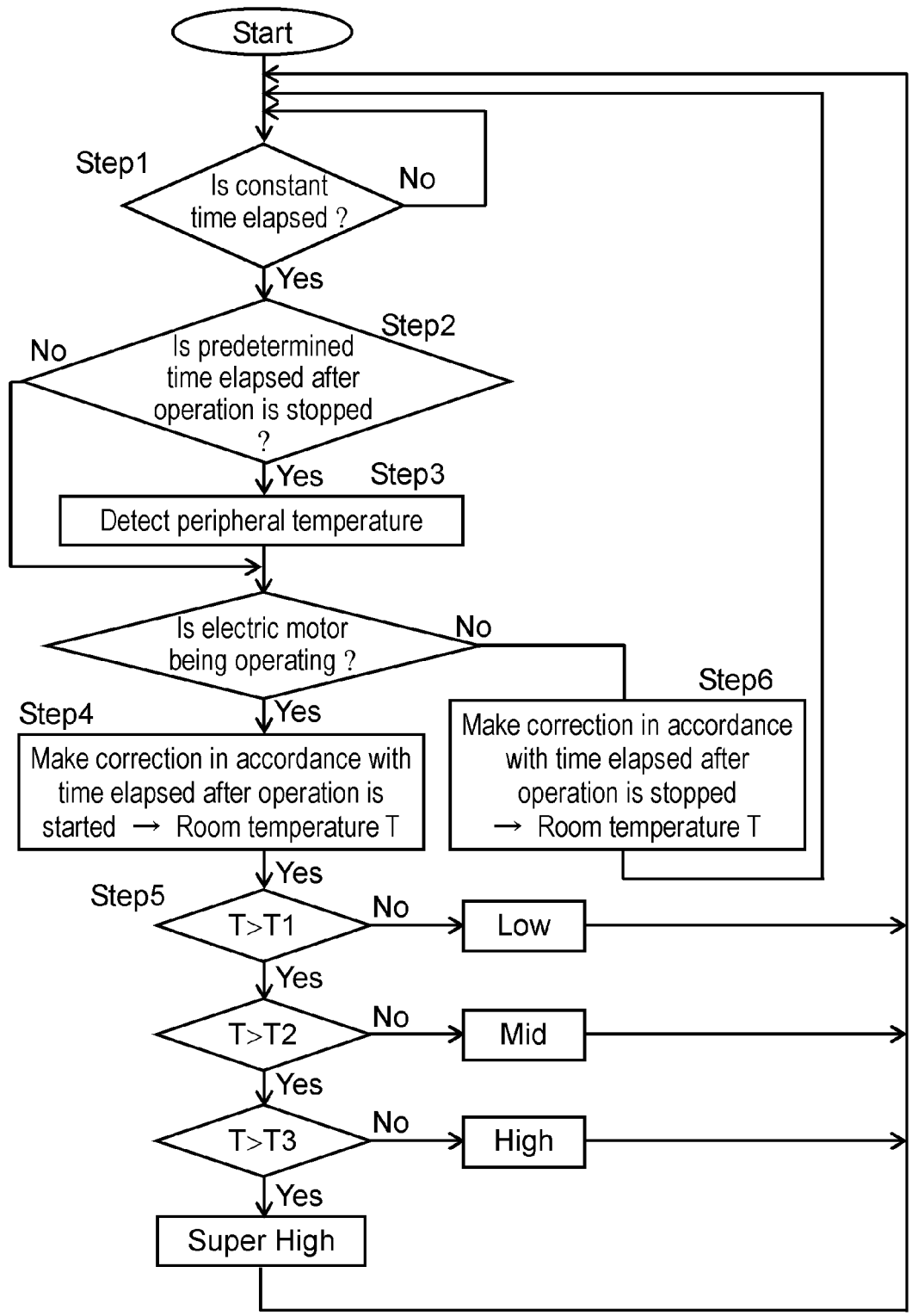
FIG. 5 is a flowchart showing an algorithm of the controller of the ceiling fan.

FIG. 5 is a flowchart showing an algorithm of the controller of the ceiling fan according to the first embodiment of the present invention. In the first embodiment of the present invention, as shown in the flowchart of FIG. 5, if constant time is elapsed (Step 1), temperature detector 6 detects a peripheral temperature (Step 3). The temperature-rise data at the time of operation of electric motor 3 is previously stored in temperature-rise storage unit 8, the detected temperature is corrected in accordance with time elapsed after start of operation, and the room temperature is estimated (Step 4). That is, a temperature detected by temperature detector 6 receives influence of heat of electric motor 3 and the temperature is detected as a temperature higher than the room temperature. Therefore, temperature correcting unit 9 subtracts a temperature-rise value stored in temperature-rise storage unit 8 from the detected temperature and estimates the room temperature. Driving unit 10 can switch the rotation of electric motor 3 in accordance with the estimated room temperature (Step 5).

When the ceiling fan, i.e., electric motor 3 is stopped, air which flows due to effect of fan blades 2 stops. As shown in FIG. 4, due to this influence, the temperature detected by temperature detector 6 abruptly rises although the room temperature is not changed. Hence, in the first embodiment of the present invention, controller 7 does not receive a temperature detected by temperature detector 6 for predetermined time t1 after the stop of electric motor 3 (shown in Step 2). Therefore, the room temperature can easily be estimated from the temperature detected by temperature detector 6 without missing estimation of the room temperature.

Controller 7 corrects the detected temperature by the effect of temperature correcting unit 9 after predetermined time t1 is elapsed in accordance with the temperature detected by temperature detector 6 and with time elapsed after the stop of operation, and estimates the room temperature (Step 6).

As shown in FIG. 4, shortly after the stop of operation of electric motor 3, the temperature of electric motor 3 is not lowered to the room temperature. For example, a temperature detected by temperature detector 6 differs between a case where the operation of electric motor 3 is again started at point A (when time t1 is elapsed after the stop of operation) in FIG. 4 and a case where the operation of electric motor 3 is again started at point B (when time t1+4×t2 is elapsed after the stop of operation in the example in FIG. 4). Therefore, it is difficult to estimate the room temperature only from time elapsed after the start of operation.

As in the first embodiment of the present invention, Steps 3, 6 and 1 are repeated from Step 1 shown in FIG. 5. Controller 7 corrects a temperature based on time elapsed after the stop of operation even after the stop of operation by temperature correcting unit 9, corrects a temperature detected by temperature detector 6, and keeps estimating the room temperature. That is, it is possible to easily correct a temperature based on time elapsed after the start of operation after the start of next operation by the configuration of above-described controller 7.

Even if temperature detector 6 is disposed in ceiling fan body 1, it is possible to correct the influence of heat of electric motor 3 and detect the room temperature as described above. The ceiling fan is operated in accordance with the room temperature, and it is possible to provide a comfortable space in accordance with the room temperature.

That is, temperature detector 6 is provided in ceiling fan body 1 and with this simple configuration, the air quantity is appropriately switched in accordance with the room temperature and ceiling fan can be operated.

In the first embodiment of the present invention, temperature correcting unit 9 previously estimates the room temperature based on the temperature-rise data at the time of operation of electric motor 3 in temperature-rise storage unit 8 with respect to a temperature detected by temperature detector 6. Alternatively, a correction value may previously be prepared based on temperature-rise data of electric motor 3, and a correction value may be added to the detected temperature at regular intervals after the operation is started or stopped.

Second Embodiment

The technique for estimating the room temperature is described in the first embodiment of the present invention. In a second embodiment of the present invention, control of the wind speed of the ceiling fan is described. In the second embodiment of the present invention, the same constituent elements as those in the first embodiment are designated with the same reference numerals and detailed descriptions thereof are omitted.

Figure 6:
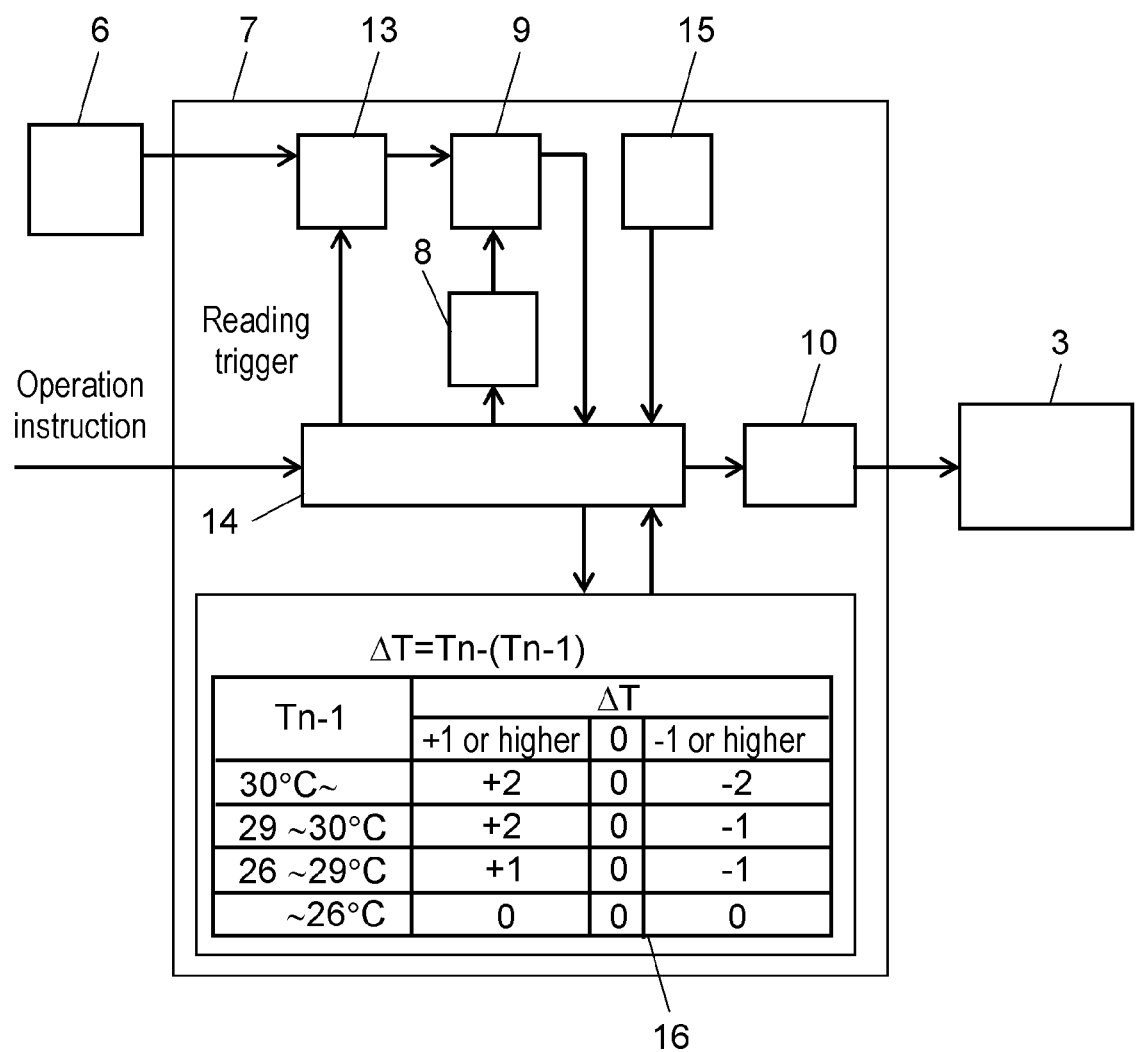
FIG. 6 is a block diagram of a ceiling fan according to a second embodiment of the present invention.

FIG. 6 is a block diagram of the ceiling fan according to the second embodiment of the present invention. As shown in FIG. 6, controller 7 includes temperature correcting unit 9, temperature-rise storage unit 8 and driving unit 10 of the first embodiment. Controller 7 further includes temperature reading unit 13, operation notch setting unit 15 and notch correcting unit 16. Temperature reading unit 13 reads a temperature detected by temperature detector 6. Operation notch setting unit 15 previously sets an operation notch of electric motor 3 in later-described main controller 14. Notch correcting unit 16 estimates a change in a room temperature from an estimated value of a room temperature at regular intervals (change value ΔT), and calculates a corrected value of the operation notch of electric motor 3.

As shown in FIG. 6, notch correcting unit 16 includes a table for calculating a corrected value of the operation notch of electric motor 3 from a change value of an estimated room temperature and from an estimated value of a room temperature as a reference (an estimated value of a room temperature detected last time). In FIG. 6, change value ΔT handles a change value which is equal to or lower than a predetermined value as "0". In the table, a corrected value of a notch of electric motor 3 is stored based on the wind speed at which an initial sensible temperature is maintained even if the room temperature is changed.

Main controller 14 adds a corrected value of notch correcting unit 16 to the operation notch of operation notch setting unit 15, and sends an operation notch signal to driving unit 10. Main controller 14 is provided therein with a clock and generates a reading trigger signal at regular intervals, and makes temperature reading unit 13 read a temperature detected by temperature detector 6. Main controller 14 further sends a corrected value from temperature-rise storage unit 8 to temperature correcting unit 9, and receives an estimated value of a room temperature from temperature correcting unit 9. Main controller 14 distinguishes, from each other, estimated value Tn of a room temperature obtained by detecting a temperature corrected by temperature correcting unit 9 at regular intervals and estimated value Tn−1 of a room temperature detected last time, and outputs them to notch correcting unit 16.

Figure 7:
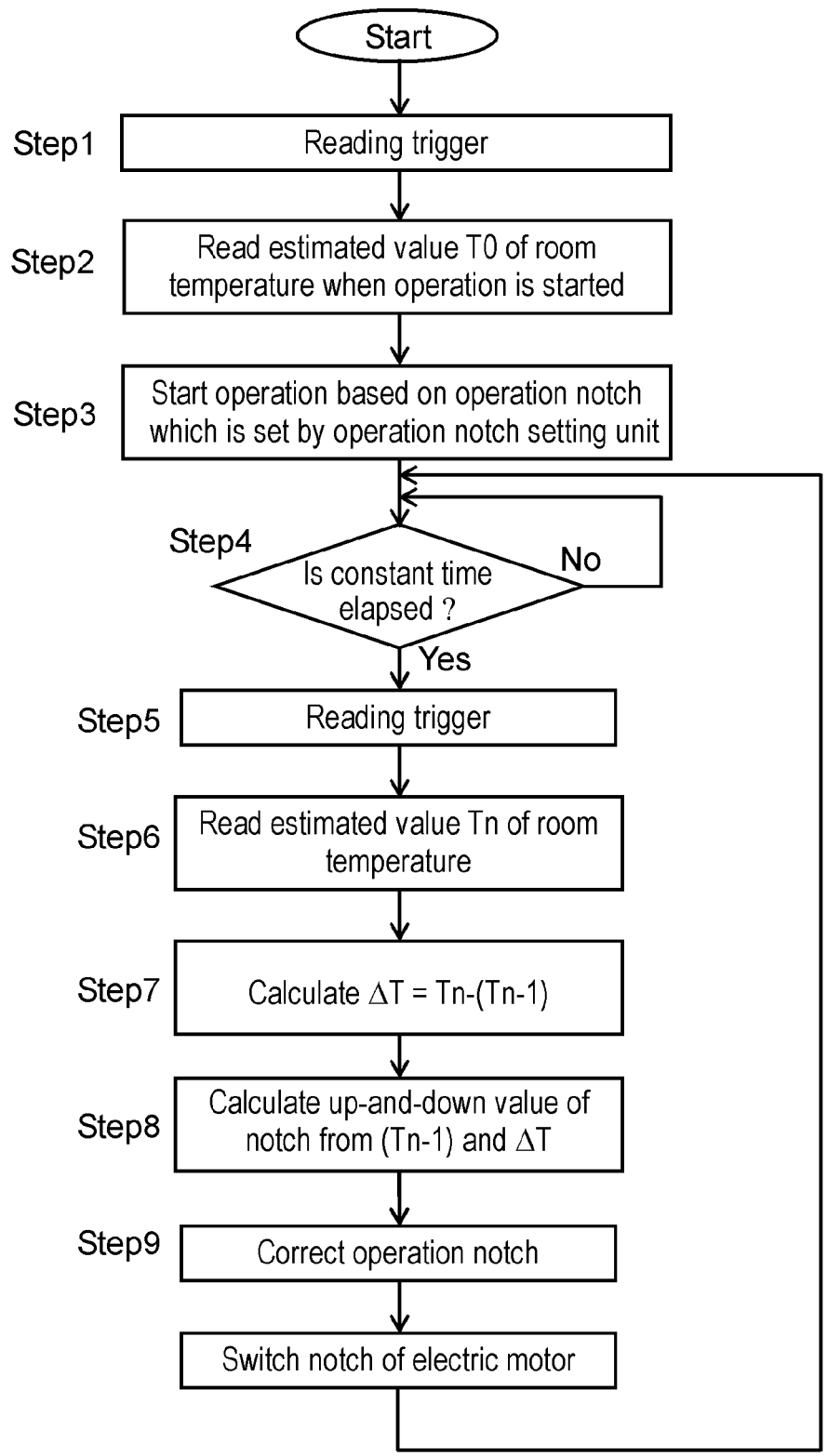
FIG. 7 is a flowchart showing an algorithm of a controller of the ceiling fan.

FIG. 7 is a flowchart showing an algorithm of the controller of the ceiling fan according to the second embodiment of the present invention. In the above-described configuration, if main controller 14 receives an instruction to start operation, main controller 14 outputs a reading trigger signal to temperature reading unit 13 as shown in Step 1 in FIG. 7. As shown in Step 2, temperature reading unit 13 reads a temperature detected by temperature detector 6. Temperature correcting unit 9 corrects a detected temperature which is read by temperature reading unit 13 using a corrected value sent from temperature-rise storage unit 8 by effect of main controller 14. This corrected detected temperature is read by main controller 14 as estimated value T0 of a room temperature at the time of start of operation. Main controller 14 outputs an operation notch which is previously set in operation notch setting unit 15 to driving unit 10, and starts operation of electric motor 3 as shown in Step 3.

If constant time in Step 4 is elapsed, a reading trigger signal is again output from main controller 14 to temperature reading unit 13 as shown in Step 5. Similarly, main controller 14 reads estimated value Tn of a room temperature after constant time from temperature correcting unit 9. Estimated value T0 of the room temperature at the time of start of operation and estimated value Tn of the room temperature after constant time are sent to notch correcting unit 16. As shown in Step 7, notch correcting unit 16 calculates change value ΔT which is a difference thereof, and as shown in Step 8, notch correcting unit 16 calculates an up-and-down value of a notch of electric motor 3 from estimated value T0 of a room temperature at the time of start of operation and change value ΔT (in FIG. 7, Tn−1 is used instead of T0. T0 is initial value of Tn−1). That is, notch correcting unit 16 determines an operation notch at which output of electric motor 3 is switched when an estimated value of a room temperature is changed by a predetermined temperature or more. Here, the predetermined temperature is 1° C. to 2° C. for example.

The up-and-down value of the notch of electric motor 3 is sent to main controller 14. Main controller 14 adds the up-and-down value of the notch to a current operation notch and sends a signal to driving unit 10. As a result, driving unit 10 adjusts the operation notch of electric motor 3 in accordance with a change in the room temperature (Step 9). Thereafter, the operation notch of electric motor 3 is adjusted in accordance with a change in the room temperature from an estimated value of the room temperature at regular intervals in the same manner. That is, driving unit 10 compares estimated values of the room temperature detected at regular time intervals, and shifting up or down operation notches for electric motor 3 based on the change thereof.

Figure 8:
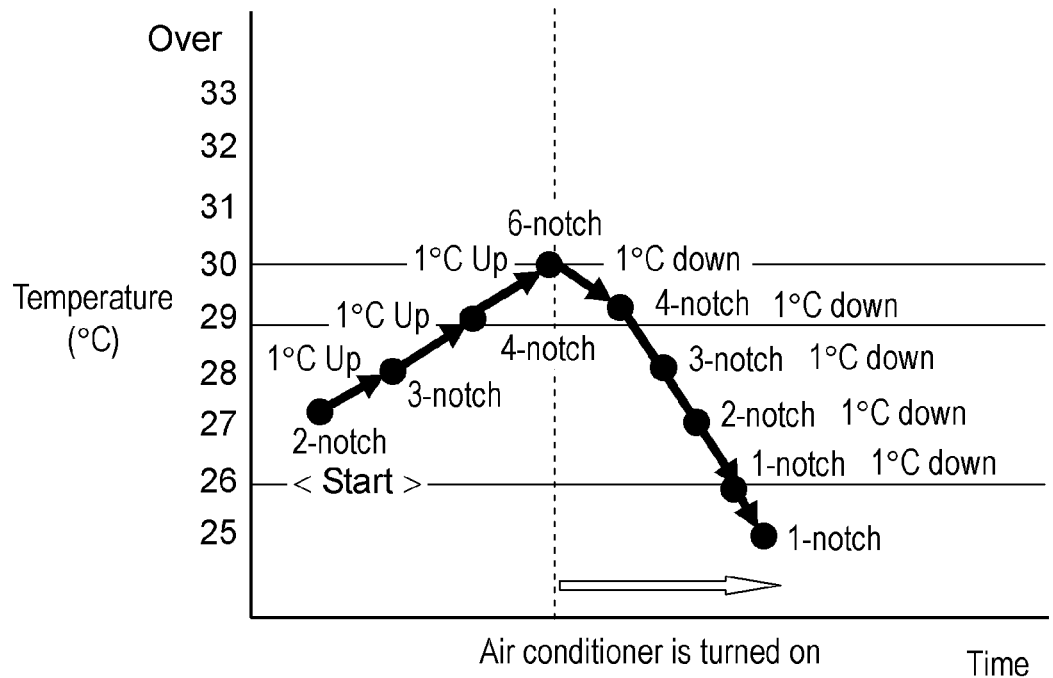
FIG. 8 is a diagram showing an operation example of the ceiling fan.

In this manner, notch correcting unit 16 determines the up-and-down value of the notch of electric motor 3 from estimated value Tn−1 and change value ΔT of the room temperature. Hence, as shown in FIG. 8 which shows an operation example of the ceiling fan of the second embodiment of the present invention, it is possible to adjust the operation notch of the ceiling fan in accordance with a change in the room temperature. Therefore, even if the room temperature is changed with respect to the operation notch which is previously set in operation notch setting unit 15, it is possible to adjust the rotation of the ceiling fan, and it is possible to maintain the sensible temperature within a predetermined range by the wind speed. Especially, even when the room temperature is abruptly lowered as in a case where a cooling switch is turned ON, it is possible to detect a change in the room temperature and the ceiling fan can be operated.

In the second embodiment of the present invention, the room temperature is estimated, and control is performed such that the operation notch of electric motor 3 is shifted up or down in accordance with a change in the room temperature. Even if temperature detector 6 is provided in the vicinity of a wall in a room and the control of the wind speed of the ceiling fan of the second embodiment of the present invention is carried out, it is possible to adjust and maintain a sensible temperature of a user within the predetermined width.

In the second embodiment of the present invention, the operation notch of electric motor 3 is previously set in operation notch setting unit 15. If the operation notch is set in accordance with a user's preferred sensible temperature, it is possible to provide a ceiling fan which can operate comfortably.

Figure 9:
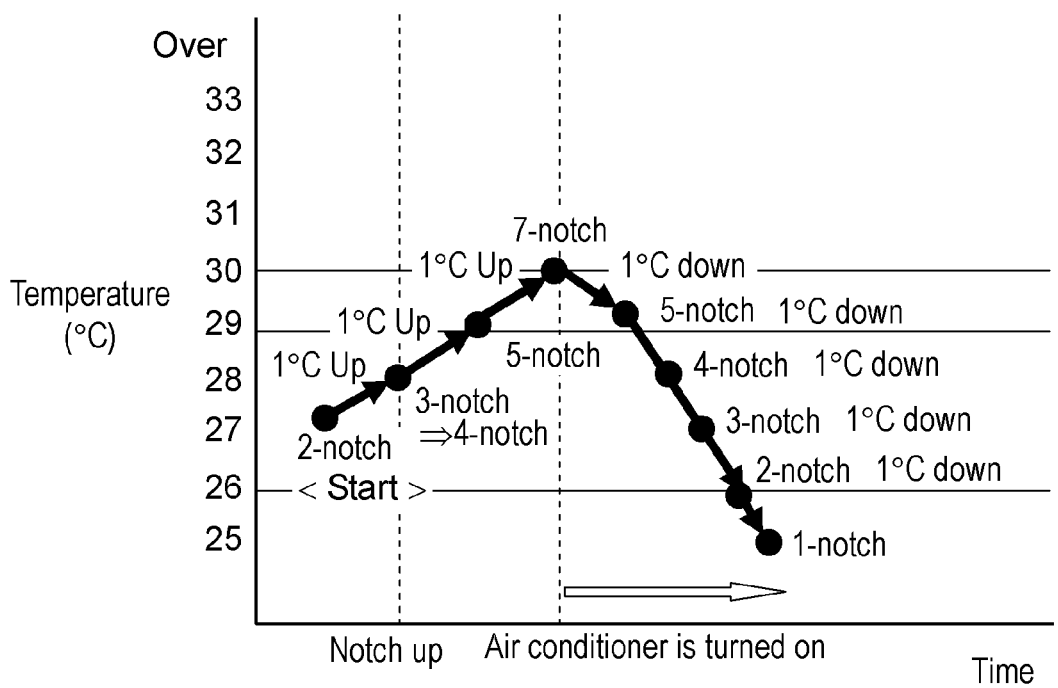
FIG. 9 is a diagram showing an operation example of the ceiling fan when the air quantity is manually changed.

FIG. 9 is a diagram showing an operation example of the ceiling fan when the air quantity is manually changed according to the second embodiment of the present invention. When the operation notch is changed during operation of the ceiling fan, the operation notch which is being operating is slid as shown in FIG. 9 and an operation notch thereafter is corrected.

Third Embodiment

Another embodiment concerning control of a wind speed of a ceiling fan of the present invention is described below. A third embodiment of the present invention is different from the second embodiment in an estimated value of a reference room temperature. That is, in the second embodiment, estimated value Tn−1 of the room temperature detected last time is subtracted as a reference from estimated value Tn of the latest room temperature, and change value ΔT is obtained. The third embodiment of the present invention is different from the second embodiment in that when change value ΔT exceeds a predetermined value, new reference value Td is handled as a reference value of an estimated value of the next room temperature. In the third embodiment of the present invention, the same constituent elements as those in the first and second embodiments are designated with the same reference numerals and detailed descriptions thereof are omitted.

Figure 10:
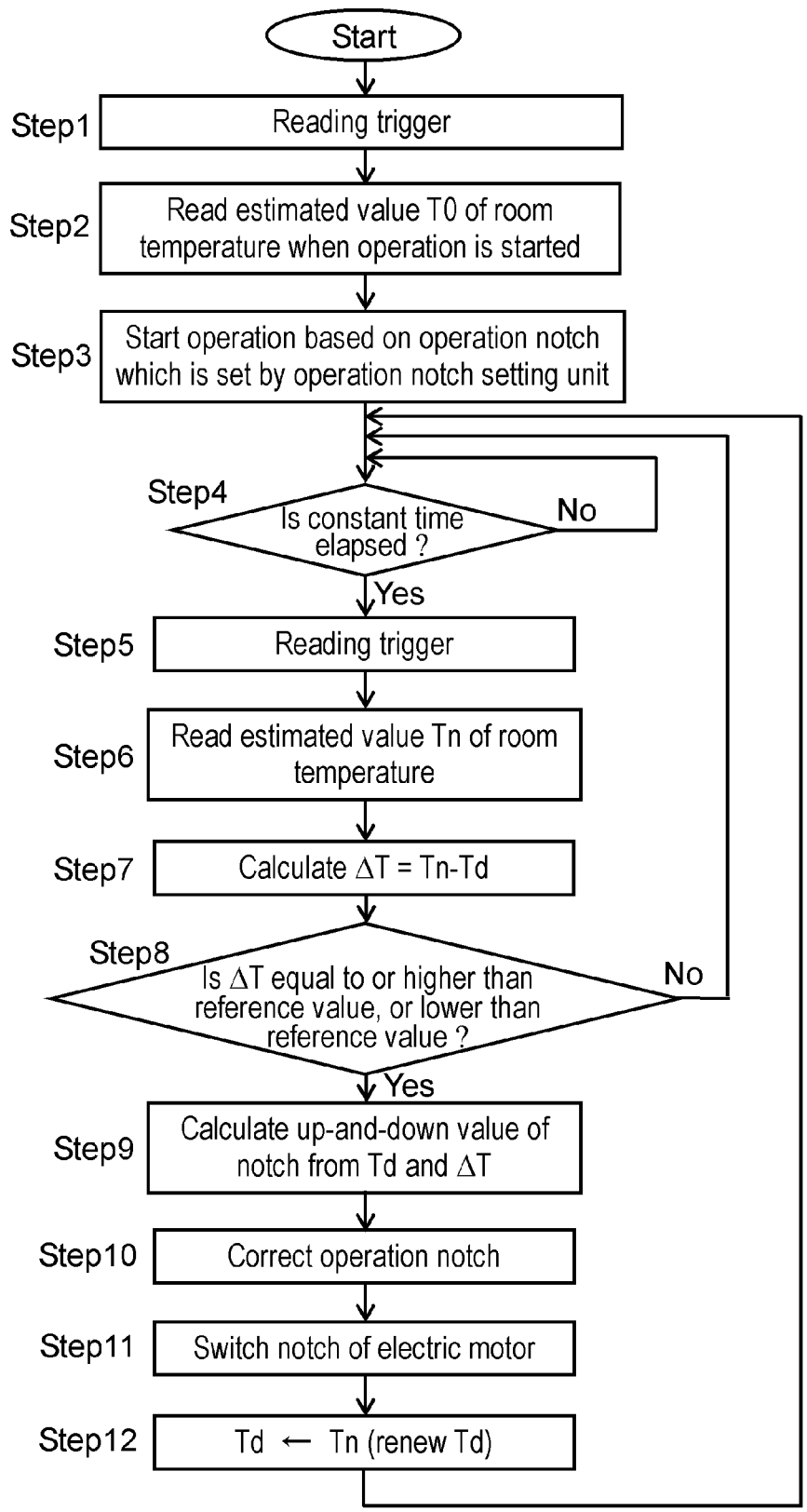
FIG. 10 is a flowchart showing an algorithm of a controller of a ceiling fan according to a third embodiment of the present invention.

FIG. 10 is a flowchart showing an algorithm of a controller of the ceiling fan according to the third embodiment of the present invention. Notch correcting unit 16 subtracts an estimated value (reference value) Td of the room temperature which is already set from estimated value Tn of a room temperature which is newly detected in Step 7, and detects change value ΔT of the room temperature. When change value ΔT is equal to or higher than a predetermined value, the procedure proceeds to Step 9 from Step 8, and an up-and-down value of a notch of electric motor 3 is calculated from Td and change value ΔT in the same manner as that of the second embodiment.

Next, main controller 14 receives the up-and-down value of the notch from notch correcting unit 16, and corrects the operation notch as shown in Step 10. As a result, the operation notch of electric motor 3 is switched as shown in Step 11. Thereafter, estimated value Tn of the latest room temperature is stored (renewed) in main controller 14 as reference value Td (Step 12).

If change value ΔT of the room temperature is smaller than the predetermined value in Step 8, the procedure returns to Step 4, and the procedure waits until constant time is elapsed. That is, notch correcting unit 16 shifting up or down operation notches for electric motor 3 which is previously set such that the operation notch maintains a sensible temperature corresponding to an estimated value of a room temperature when operation is started by the operation notch.

The operation notch of electric motor 3 is changed when change value ΔT becomes equal to or higher than the predetermined value as described above. The room temperature is estimated by renewing reference value Td of the room temperature, and control is performed such that the operation notch of electric motor 3 is increased or decreased in accordance with a change of the room temperature.

It is possible to carry out the adjustment to maintain a user's sensible temperature within a predetermined width by providing temperature detector 6 in the vicinity of a wall in a room and by carrying out the control of the wind speed of the ceiling fan of the third embodiment of the present invention. According to the third embodiment of the present invention, when a room temperature is slowly changed as compared with the second embodiment, it is possible to adjust in a manner to follow the operation notch of the ceiling fan in accordance with the change, the sensible temperature can precisely be maintained, and a comfortable space can be created.

If a result of Step 8 in FIG. 10 is No, a destination of regression is between Steps 3 and 4. However, if the destination of regression is set between Steps 4 and 5, change value ΔT becomes equal to or higher than the predetermined value after constant time is elapsed in Step 4, and it is possible to always monitor the same until the operation notch of electric motor 3 is changed.

Figure 11:
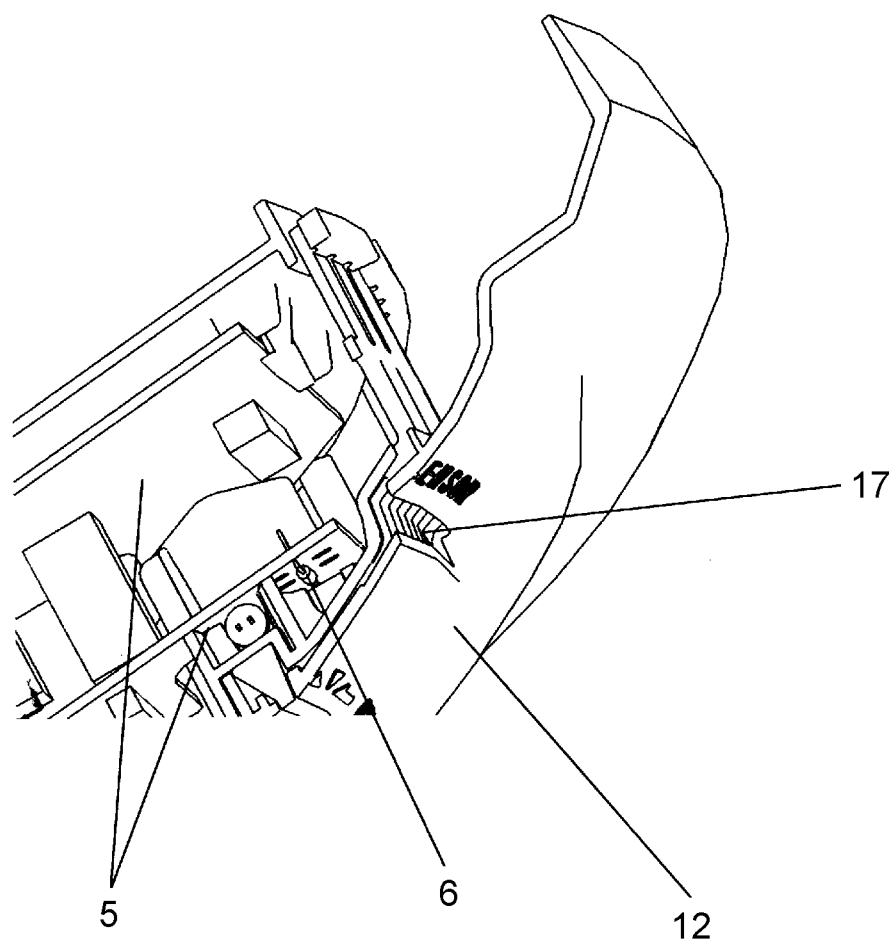
FIG. 11 is a diagram showing configurations of a decoration cap and a temperature detector of the ceiling fan.

In the first and second embodiments of the present invention, temperature detector 6 is disposed inside of decoration cap 12. FIG. 11 is a diagram showing configurations of a decoration cap and a temperature detector of the ceiling fan of the third embodiment of the present invention. As shown in FIG. 11, slits 17 are provided in decoration cap 12 at locations facing temperature detector 6 to enhance ventilation characteristics, and response of temperature detector 6 with respect to a change in the room temperature can be enhanced. If decoration cap 12 is made of metal (e.g., aluminum having high thermal conductivity), it becomes easy to detect the change in a room temperature as compared with a case when decoration cap 12 is made of resin, and it is possible to enhance response of temperature detector 6 with respect to a change in a room temperature.

Fourth Embodiment

Figure 12:
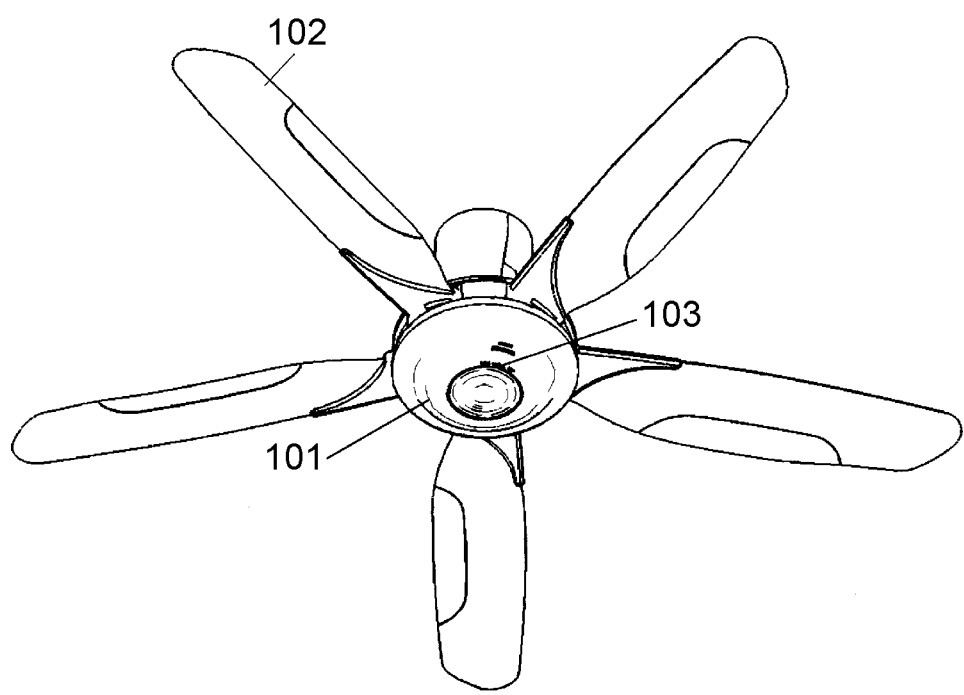
FIG. 12 is a perspective view showing an installation example of a ceiling fan according to a fourth embodiment of the present invention.

FIG. 12 is a perspective view showing an installation example of a ceiling fan according to a fourth embodiment of the present invention. As shown in FIG. 12, the ceiling fan is mounted on a ceiling. Ceiling fan body 101 includes five fan blades 102 for example and electric motor 103 which rotates fan blades 102.

Figure 13:
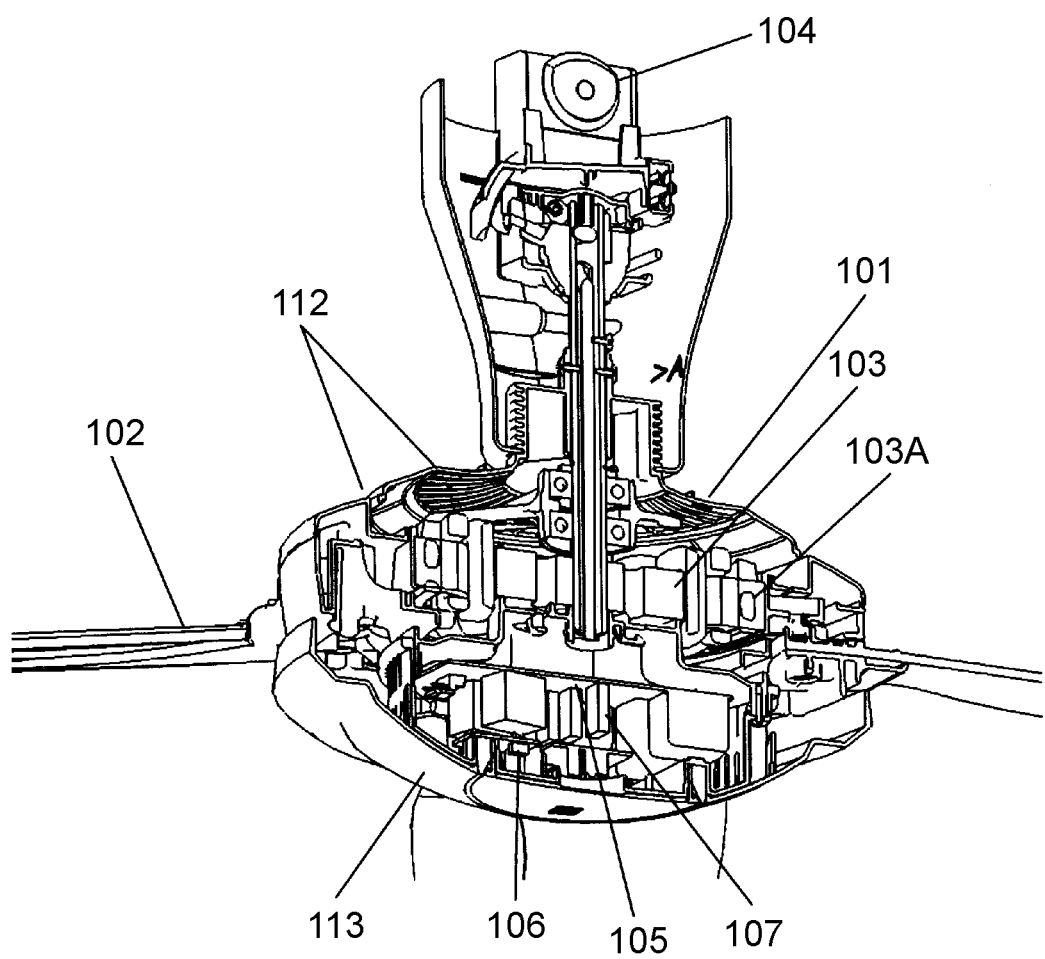
FIG. 13 is a diagram showing a configuration of the ceiling fan.

FIG. 13 is a diagram showing a configuration of the ceiling fan of the fourth embodiment of the present invention. As shown in FIG. 13, ceiling fan body 101 includes connecting portion 104, electric motor 103, fan blades 102 and control substrate 105. Connecting portion 104 fixed to the ceiling fixes the ceiling fan to the ceiling. Electric motor 103 has an outer rotor shape which is suspended from connecting portion 104 vertically downward and disposed. Fan blades 102 are directly connected to rotor 103A disposed on the side of an outer periphery of electric motor 103. Control substrate 105 is disposed closer to an inner periphery of electric motor 103 than a position of rotor 103A.

Temperature detector 106 and controller 107 are disposed on control substrate 105. Temperature detector 106 is disposed at a location closer to an outer periphery of electric motor 103, and detects a peripheral temperature. Controller 107 stores an operation notch state by a user's manual setting in each room temperature region by a later-described configuration based on a temperature detected by temperature detector 106, and controls operation of electric motor 103.

Figure 14:
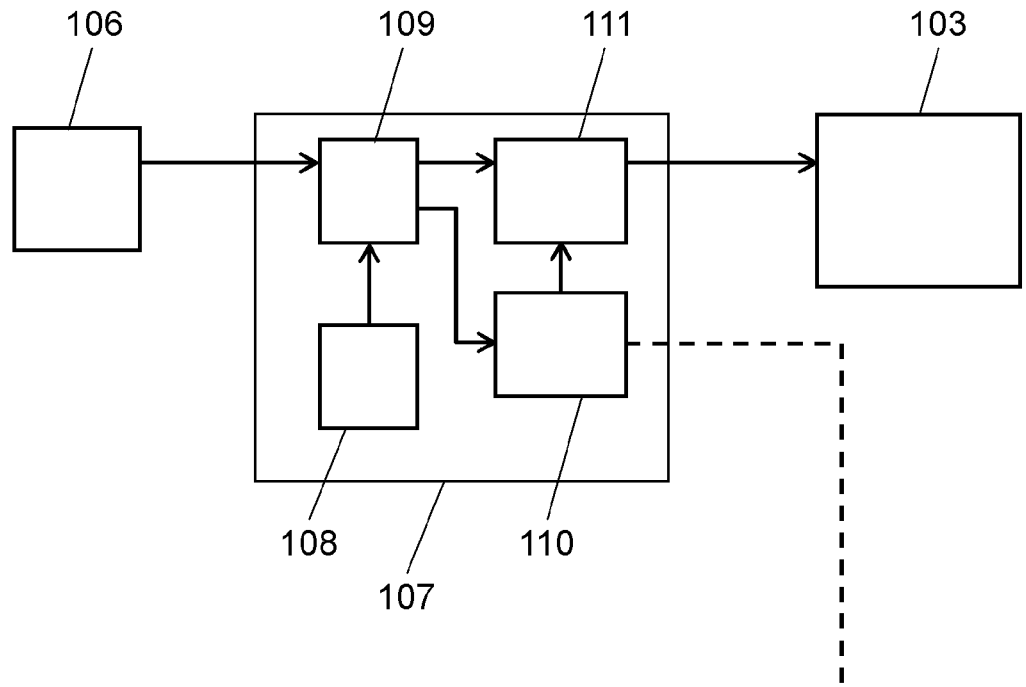
FIG. 14 is a block diagram of a controller of the ceiling fan.

FIG. 14 is a block diagram of the controller of the ceiling fan of the fourth embodiment of the present invention. As shown in FIG. 14, controller 107 includes temperature-rise storage unit 108, temperature correcting unit 109, wind speed storage unit 110 and driving unit 111. Temperature-rise data at the time of operation of electric motor 103 is previously stored in temperature-rise storage unit 108. Temperature correcting unit 109 corrects a detected temperature of temperature detector 106 by data of temperature-rise storage unit 108 and estimates a room temperature. Wind speed storage unit 110 stores an operation notch of manual setting corresponding to the room temperature estimated by temperature correcting unit 109. Driving unit 111 operates electric motor 103 based on the room temperature estimated by temperature correcting unit 109 when automatic operation is selected, and also based on an operation notch stored in wind speed storage unit 110.

FIG. 14 shows a data table example as one example of a storing method in wind speed storage unit 110. As a temperature region table (vertical axis) of a room temperature, the data table example shown in FIG. 14 includes a region lower than 20° C., regions from 20° C. to 34° C. on a one ° C. basis, and a region of 35° C. or higher. As a wind speed to be stored (lateral axis), the data table example of the data table includes five air quantities from FM1 to FM5. The number of using times of wind speeds which are manually set every temperature is stored in this matrix-like table, and it is possible to grasp a using tendency of a user with respect to a room temperature. As a storing method and a method of determining an operation notch at the time of automatic operation from its memory, five latest manual setting statuses are stored every temperature, and an operation notch having the highest frequency is selected. Here, the storing number can freely be set. As the determining method of the operation notch at the time of the automatic operation, in addition to the method using the highest frequency, there are a method of averaging operation notches and selecting the closest operation notch, and a method of collecting weight by assigning weights using tendency.

That is, as shown in FIG. 13, the ceiling fan includes connecting portion 104 fixed to the ceiling, electric motor 103 disposed on a lower portion of connecting portion 104 such that a rotation shaft of electric motor 103 is directed vertically, temperature detector 106 disposed on a lower portion of electric motor 103 for detecting a peripheral temperature, and controller 107. Controller 107 estimates a room temperature by a temperature detected by temperature detector 106, and stores an operation notch which is set by a user with respect to estimated room temperature to drive electric motor 103.

Upper cover 112 is provided from an upper side of electric motor 103 and decoration cap 113 is provided from a lower side of electric motor 103 in a manner to entirely cover electric motor 103, rotor 103A and control substrate 105. That is, temperature detector 106 is disposed inside of decoration cap 113.

Temperature correcting unit 109 corrects time elapsed from the start of operation of electric motor 103, time elapsed from stop of operation of electric motor 103, and a temperature detected by temperature detector 106 in association with the temperature-rise data. That is, controller 107 includes temperature correcting unit 109 for correcting the temperature detected by temperature detector 106 in accordance with time elapsed from the start of operation of ceiling fan, and which corrects a temperature detected by temperature detector 106 in accordance with time elapsed from stop of operation.

Controller 107 does not start temperature detection within a predetermined time after operation is stopped. Here, predetermined time is 10 minutes to 15 minutes for example.

In the above-described configuration, if the ceiling fan, i.e., electric motor 103 is operated, since electric motor 103 is disposed on an inner side of upper cover 112 and decoration cap 113, influence of temperature rise of electric motor 103 remarkably appears inside of decoration cap 113.

Figure 15:
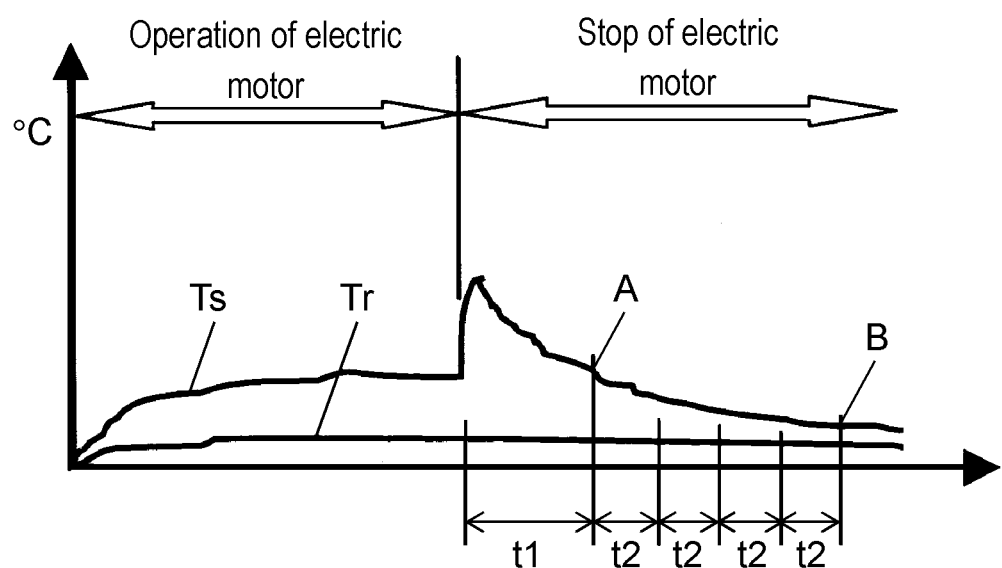
FIG. 15 is a diagram showing a temperature detected by a temperature detector of the ceiling fan.

FIG. 15 is a diagram showing a temperature detected by a temperature detector of the ceiling fan according to the fourth embodiment of the present invention. Since temperature detector 106 is disposed inside of decoration cap 113, as shown in FIG. 15, detected temperature Ts rises while receiving influence of heat of electric motor 103 with respect to room temperature.

Figure 16:
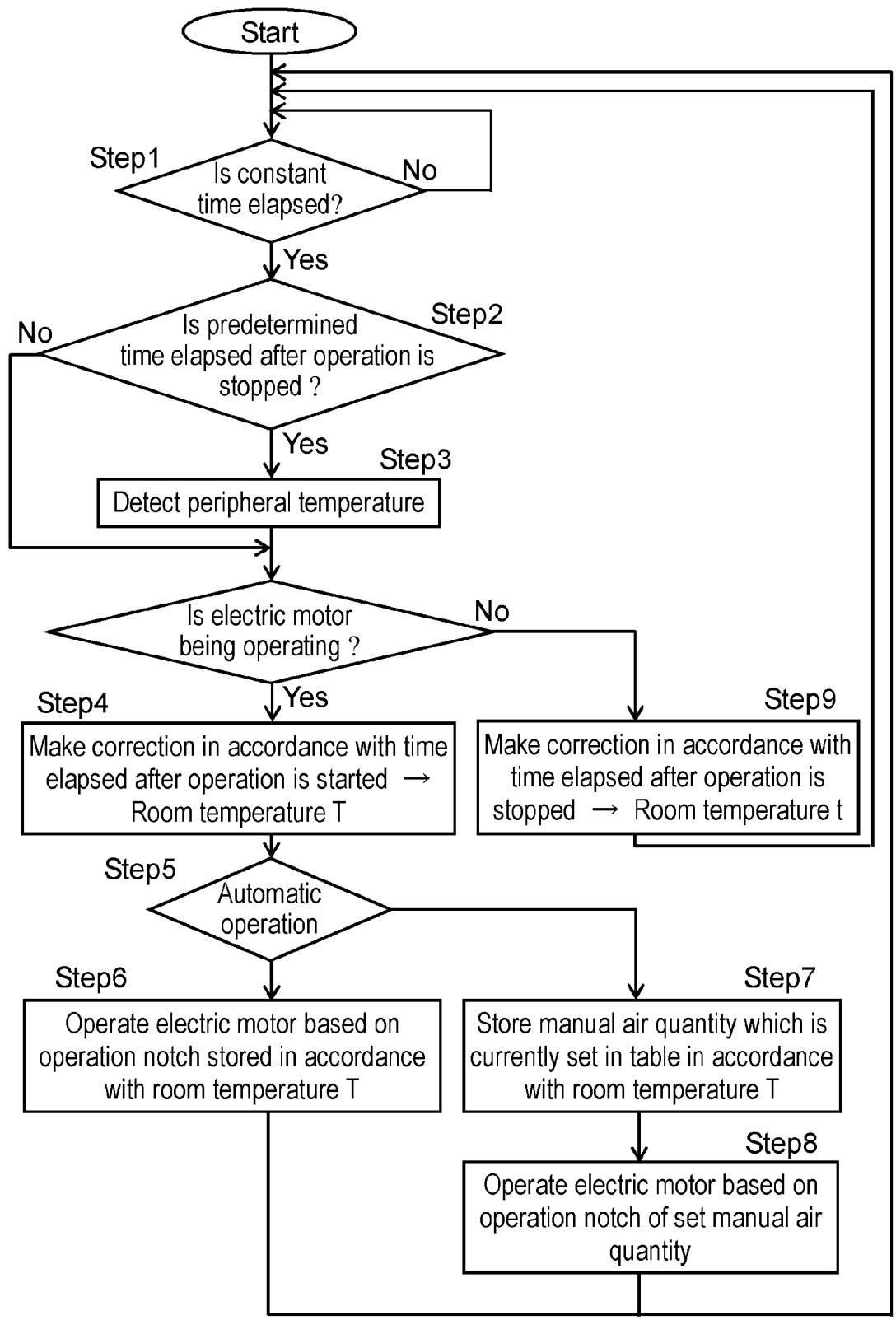
FIG. 16 is a flowchart showing an algorithm of the controller of the ceiling fan.

FIG. 16 is a flowchart showing an algorithm of the controller of the ceiling fan according to the fourth embodiment of the present invention. In the fourth embodiment of the present invention, as shown in the flowchart in FIG. 16, if constant time is elapsed (Step 1), temperature detector 106 detects a peripheral temperature (Step 3). Temperature-rise data at the time of operation of electric motor 103 is previously stored in temperature-rise storage unit 108, a detected temperature is corrected in accordance with time elapsed after start of operation and a room temperature is estimated (Step 4). That is, a temperature detected by temperature detector 106 receives influence of heat of electric motor 103 and the detected temperature is detected as a temperature higher than the room temperature. Therefore, temperature correcting unit 109 subtracts a temperature rise value stored in temperature-rise storage unit 8 from the detected temperature and estimates the room temperature (room temperature T). When the automatic operation is set, driving unit 111 can switch the rotation of electric motor 103 by the operation notch stored in wind speed storage unit 110 like the data table example shown in FIG. 15 in accordance with estimated room temperature T (Step 6). When the manual operation is set, wind speed storage unit 110 stores the operation notch of manual setting with respect to estimated room temperature T (Step 7), and driving unit 111 can switch the rotation of electric motor 103 by the manually set operation notch (Step 8). Here, as an example of a storing method, in the data table example in FIG. 14, the number of times of the manually set wind speed is added to a place corresponding to room temperature T with respect to the matrix of the room temperature and the wind speed.

When the ceiling fan, i.e., electric motor 103 is stopped, air which flows by the effect of fan blade 102 stops. As shown in FIG. 15, a temperature detected by temperature detector 106 receives this influence and the detected temperature abruptly rises even though a room temperature is not changed. In the fourth embodiment of the present invention, controller 107 does not take in a temperature detected by temperature detector 106 for predetermined time t1 after electric motor 103 stops (shown in Step 2). Hence, it is possible to easily estimate the room temperature from the temperature detected by temperature detector 106 without missing the estimation of the room temperature.

After predetermined time t1 is elapsed, controller 107 corrects the detected temperature in accordance with the temperature detected by temperature detector 106 and time elapsed after stop of operation by the effect of temperature correcting unit 109, and controller 107 estimates the room temperature (Step 9).

As shown in FIG. 15, a temperature of electric motor 103 is not lowered to the room temperature for a while after the operation of electric motor 103 is stopped. The temperature detected by temperature detector 106 differs between a case where operation of electric motor 103 is again started at point A in FIG. 15 (time t1 is elapsed after operation is stopped) and a case where operation of electric motor 103 is again started at point B (in the example of the drawing, time t1+4×t2 is elapsed after operation is stopped). Due to this reason, it is difficult to estimate the room temperature only from time elapsed after the operation is started.

Hence, like the fourth embodiment of the present invention, Steps 3, 9 and 1 are repeated from Step 1 shown in FIG. 16. Controller 107 corrects the temperature by time elapsed after the operation is stopped by temperature correcting unit 109 even after the operation is stopped and in this state, controller 107 corrects a temperature detected by temperature detector 106 and keeps estimating the room temperature. That is, by the configuration of controller 107, it is possible to easily correct the temperature by time elapsed after the operation is started after the next operation is started.

Even if temperature detector 106 is disposed within ceiling fan body 101, controller 107 can correct influence of heat of electric motor 103 and can detect the room temperature in the manner described above. The operation notch which is manually set by a user in accordance with the room temperature can be stored. According to this, it is possible to automatically select an operation notch desired by the user in accordance with the room temperature at the time of the automatic operation and the ceiling fan is operated, and it is possible to respectively provide a user with a comfortable space in accordance with the room temperature.

That is, temperature detector 106 is provided in ceiling fan body 101 and with this simple configuration, the air quantity is appropriately switched in accordance with the room temperature in accordance with air conditioning taste of a user and ceiling fan can be operated.

In the fourth embodiment of the present invention, temperature correcting unit 109 previously estimates the room temperature based on the temperature-rise data at the time of operation of electric motor 103 in temperature-rise storage unit 108 with respect to the temperature detected by temperature detector 106. Alternatively, a corrected value may previously be prepared based on the temperature-rise data of electric motor 103, and the corrected value may be added to the detected temperature at regular intervals after the operation is started or stopped.

When operation is not stored by the manual setting of a user, if a standard operation notch is previously and temporarily stored in accordance with a region of a room temperature, the ceiling fan can automatically be operated when the ceiling fan is initially used.

Fifth Embodiment

In the fourth embodiment of the present invention, the technique for estimating the room temperature and the configuration of the storing function of the operation notch which is manually set by a user with respect to the estimated room temperature are described. In a fifth embodiment of the present invention, a storing function of an operation notch of a ceiling fan and wind speed control are described. In the fifth embodiment of the present invention, the same constituent elements as those in the fourth embodiment are designated with the same reference numerals and detailed descriptions thereof are omitted.

Figure 17:
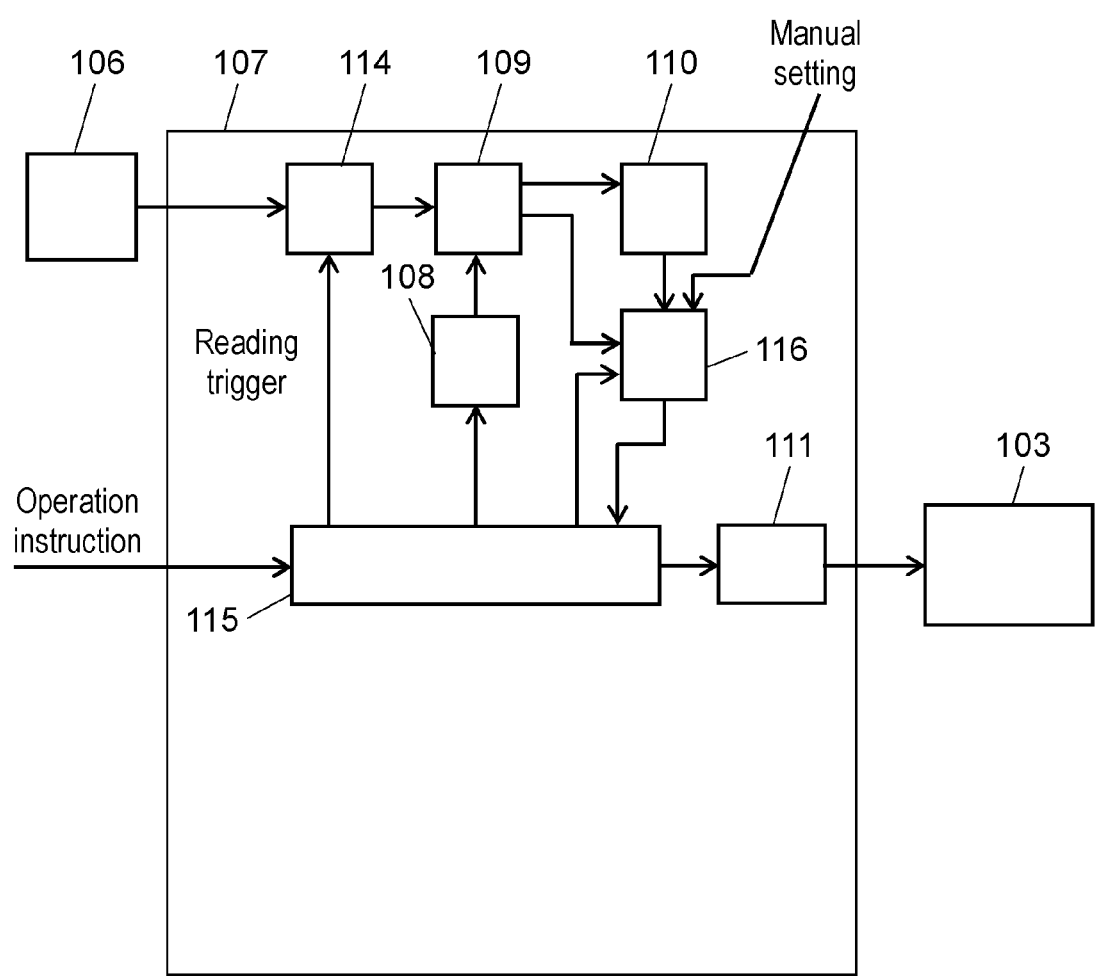
FIG. 17 is a block diagram of a ceiling fan according to a fifth embodiment of the present invention.

FIG. 17 is a block diagram of the ceiling fan according to the fifth embodiment of the present invention. As shown in FIG. 17, controller 107 includes temperature correcting unit 109, temperature-rise storage unit 108, wind speed storage unit 110 and driving unit 111 of the fourth embodiment. Controller 107 further includes temperature reading unit 114 and operation notch setting unit 116. Here, temperature reading unit 114 reads a temperature detected by temperature detector 106. Operation notch setting unit 116 sets information of wind speed storage unit 110 in later-described main controller 115 or sets an operation notch for instructing driving unit 111 to previously operate electric motor 103 by an instruction of manual setting.

When main controller 115 receives the operation instruction, main controller 115 makes temperature reading unit 114 read a temperature detected by temperature detector 106, and makes temperature correcting unit 109 send a corrected value from temperature-rise storage unit 108. Main controller 115 makes operation notch setting unit 116 read an estimated value of a room temperature from temperature correcting unit 109 and determine an operation notch corresponding to the room temperature. Main controller 115 receives the determined operation notch and sends an operation notch signal to driving unit 111. Main controller 115 is provided therein with a clock, and main controller 115 makes temperature reading unit 114 read a temperature detected by temperature detector 106 at regular intervals. Main controller 115 makes temperature correcting unit 109 send a corrected value from temperature-rise storage unit 108, main controller 115 makes operation notch setting unit 116 read an estimated value of the room temperature from temperature correcting unit 109 and determine an operation notch corresponding to the room temperature. Main controller 115 receives the determined operation notch and sends an operation notch signal to driving unit 111. Main controller 115 distinguishes, from each other, estimated value Tn of a room temperature obtained by detecting a corrected temperature of temperature correcting unit 109 at regular intervals and estimated value Tn−1 of a room temperature detected last time, and outputs the same to wind speed storage unit 110 and operation notch setting unit 116.

Figure 18:
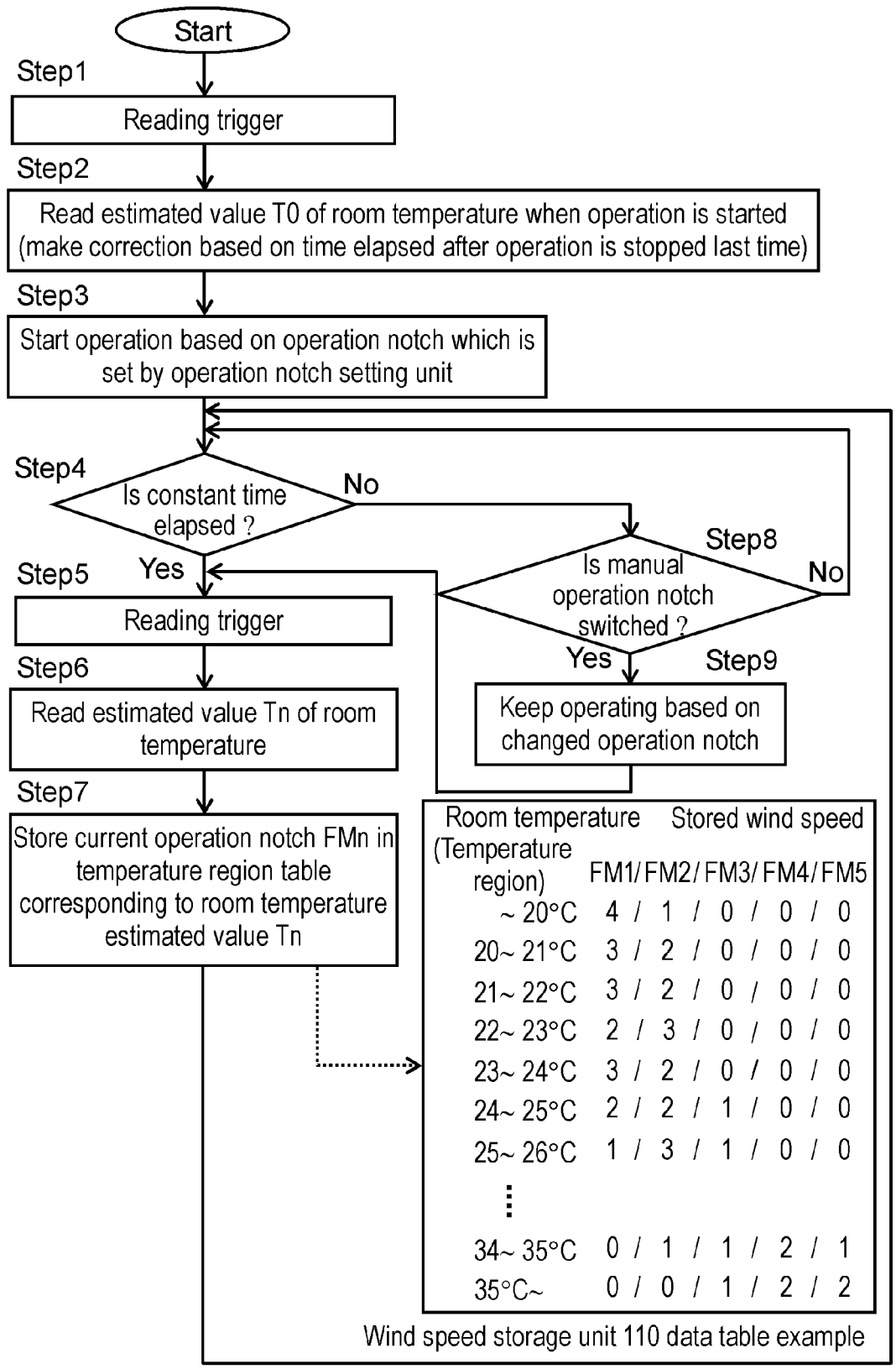
FIG. 18 is a flowchart showing an algorithm of a controller of the ceiling fan.

FIG. 18 is a flowchart showing an algorithm of a controller of the ceiling fan of the fifth embodiment of the present invention. In the above-described configuration, if main controller 115 receives an instruction to start operation, main controller 115 outputs a reading trigger signal to temperature reading unit 114 as shown in Step 1 in FIG. 18. A temperature is corrected by time elapsed after the operation is stopped last time by temperature reading unit 114 and temperature-rise storage unit 108 as shown in Step 2 and in this state, a detected temperature of temperature detector 106 is read. Temperature correcting unit 109 corrects the detected temperature which is read by temperature reading unit 114 using the corrected value which is sent from temperature-rise storage unit 108 by effect of main controller 115. This corrected detected temperature is read by main controller 115 as estimated value T0 of a room temperature when the operation is started. When the operation is carried out manually, main controller 115 reads an operation notch which is previously set by operation notch setting unit 116 and based on this information, an operation instruction is output to driving unit 111. As shown in Step 3, the operation of electric motor 103 is started and at the same time, a detected temperature and an operation notch at these intervals are stored in wind speed storage unit 110.

If constant time in Step 4 is elapsed, the reading trigger signal is again output from main controller 115 to temperature reading unit 114 as shown in Step 5. Similarly, main controller 115 reads estimated value Tn of a room temperature after constant time from temperature correcting unit 109. Estimated value Tn of the room temperature at the time is sent to wind speed storage unit 110, and wind speed storage unit 110 stores an operation notch which is manually set at these intervals in a table to which the room temperature belongs as shown in Step 7. A data table example of wind speed storage unit 110 shown in FIG. 18 includes a temperature region lower than 20° C., temperature regions from 20° C. to 35° C. on a one ° C. basis, and a region of 35° C. or higher. When a wind speed which can be set in the ceiling fan includes five stages from FM1 to FM5, speeds selected last five times in each temperature region are stored.

When a user switches between manually set operation notches (Step 8), the ceiling fan is operated by the changed operation notch (Step 9). A reading trigger is taken out from Step 5, the changed operation notch is stored in the table of the room temperature which is estimated at these intervals, thereby renewing a using status of a user.

Figure 19:
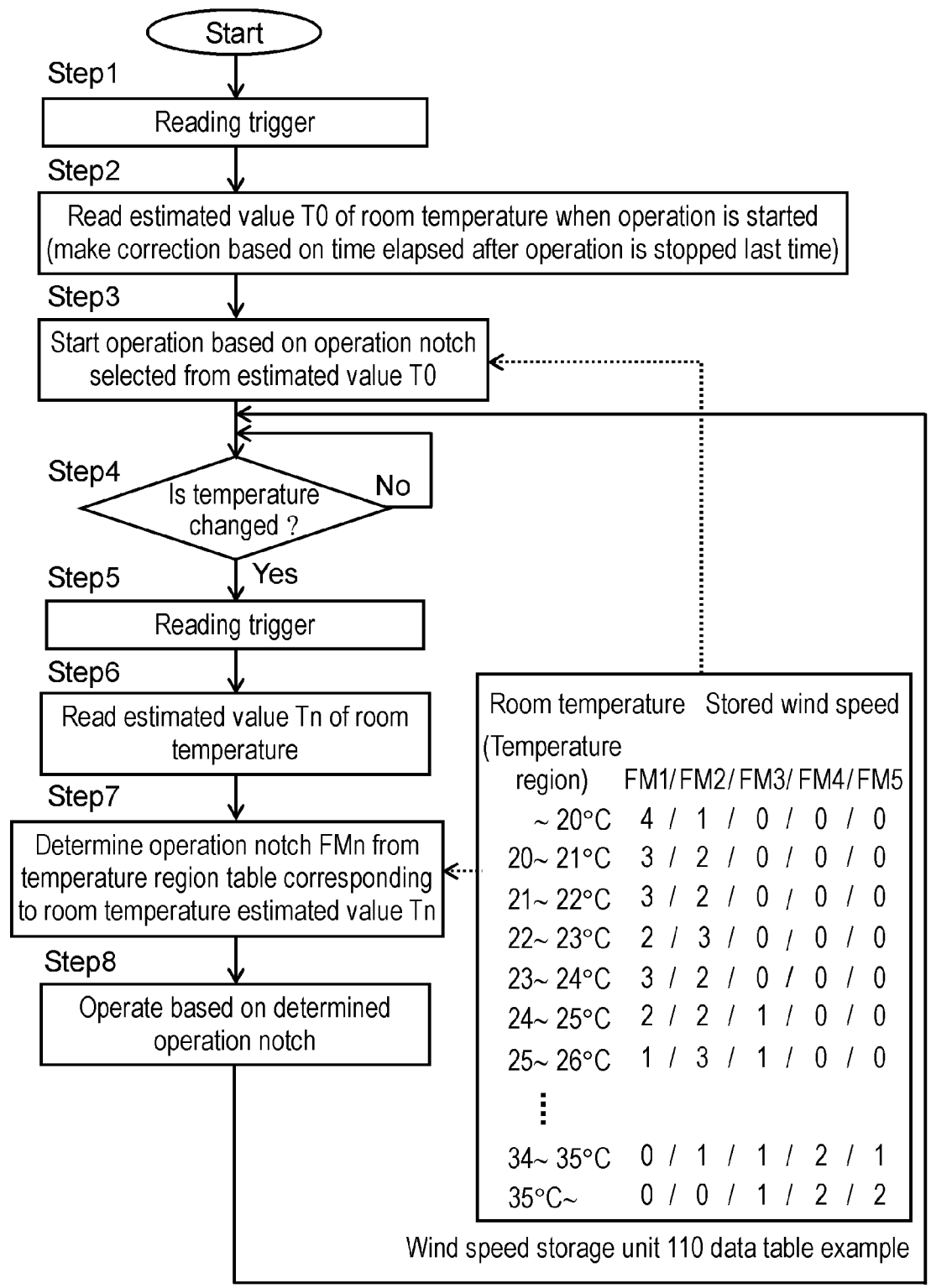
FIG. 19 is a flowchart showing another algorithm of the controller of the ceiling fan.

FIG. 19 is a flowchart showing another algorithm of the controller of the ceiling fan of the fifth embodiment of the present invention. When a user selects the automatic operation as shown in FIG. 19, if main controller 115 receives an instruction to start operation, main controller 115 outputs a reading trigger signal to temperature reading unit 114 as shown in Step 1. A temperature is corrected by time elapsed after the operation is stopped last time by temperature reading unit 114 and temperature-rise storage unit 108 as shown in Step 2, and a temperature detected by temperature detector 106 is read. Temperature correcting unit 109 corrects the detected temperature which is read by temperature reading unit 114 using the corrected value which is sent from temperature-rise storage unit 108 by effect of main controller 115. This corrected detected temperature is read by main controller 115 as estimated value T0 of a room temperature when the operation is started. If the operation is carried out automatically, main controller 115 reads an operation notch which is corresponding to a room temperature T0 from wind speed storage unit 110 and based on this information, main controller 115 outputs an operation instruction to driving unit 111. Then, operation of electric motor 103 is started as shown in Step 3.

During the manually set operation shown in FIG. 18, if the operation is switched to the automatic operation, the procedure is started from Step 5 in FIG. 19. As a result, the automatic operation corresponding to a room temperature which is estimated at these intervals can be carried out. On the contrary, during the automatically set operation shown in FIG. 19, if the operation is switched to the manually set operation, the procedure is shifted to Step 8 in FIG. 18, and the manually set operation can be carried out smoothly.

When the manually set operation is shifted to the automatically set operation, the manual setting which is set at these intervals can be used as the initial operation as it is until a temperature is changed to a next temperature region.

In the fifth embodiment of the present invention, the temperature regions are provided as described above, and the number of selection times of the air quantities (FM1 to FM5) which can be set for the temperature regions is stored. Alternatively, a temperature which is used for each air quantity may be stored, and the number of storing times can freely be set.

Sixth Embodiment

Another embodiment of wind speed control of the ceiling fan of the present invention is described. In a sixth embodiment of the present invention, the same constituent elements as those in the fourth and fifth embodiments are designated with the same reference numerals and detailed descriptions thereof are omitted.

Figure 20:
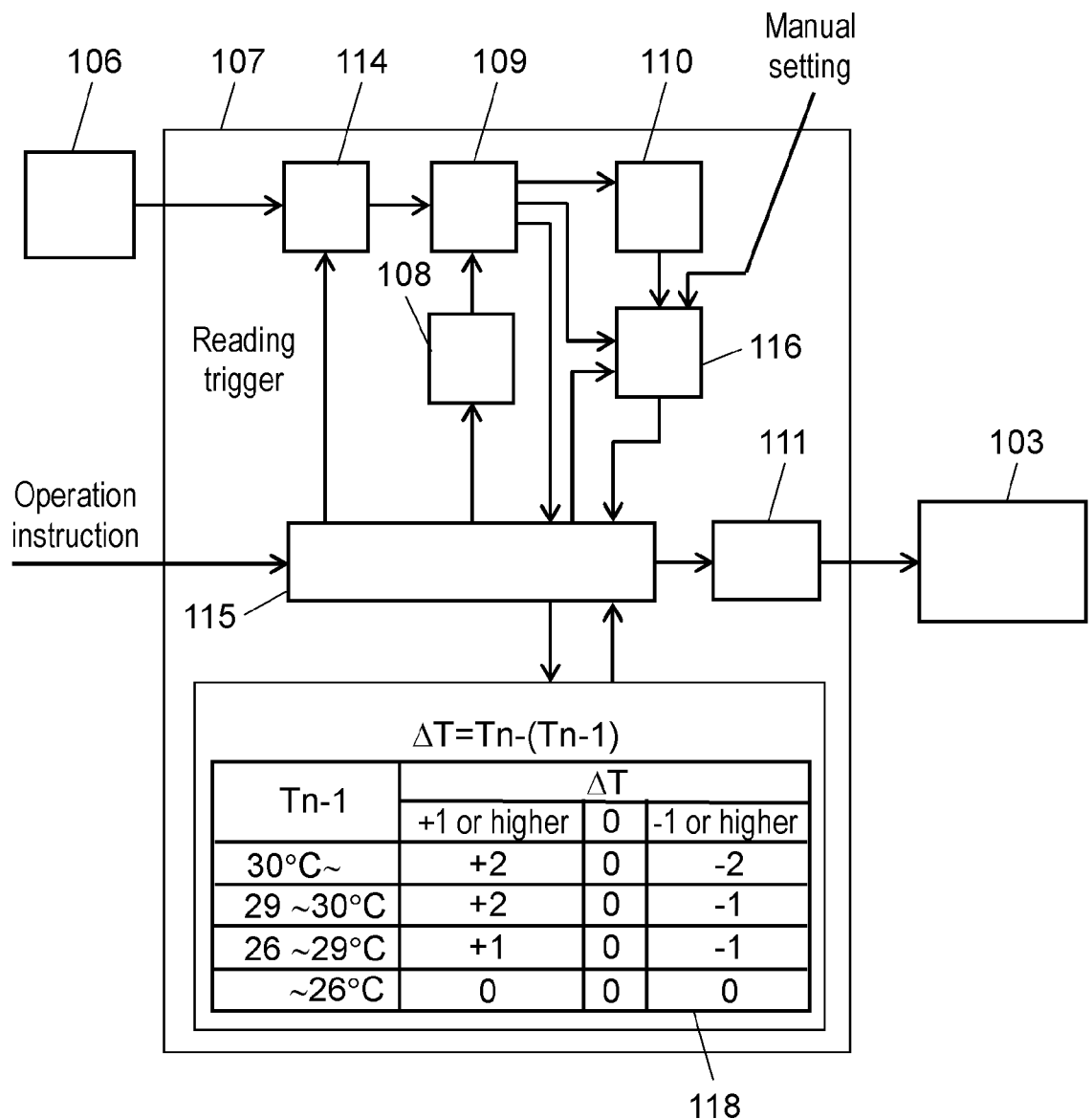
FIG. 20 is a block diagram of a ceiling fan according to a sixth embodiment of the present invention.

FIG. 20 is a block diagram of the ceiling fan according to the sixth embodiment of the present invention. Controller 107 includes temperature correcting unit 109, temperature-rise storage unit 108, wind speed storage unit 110 and driving unit 111 of the fourth embodiment. Controller 107 further includes temperature reading unit 114 and operation notch setting unit 116. Controller 107 is provided therein with a clock. Controller 107 also includes notch correcting unit 118. Notch correcting unit 118 estimates ($\Delta T$) a change in the room temperature from an estimated value of the room temperature at regular intervals, and calculates a corrected value of an operation notch. Notch correcting unit 118 estimates ($\Delta T$) the change in the room temperature from an estimated value of the room temperature at regular intervals, and calculates a corrected value of the operation notch.

As shown in FIG. 20, notch correcting unit 118 includes a table for calculating a corrected value of an operation notch of electric motor 103 from a change value of an estimated room temperature and from an estimated value of a reference room temperature (estimated value of a room temperature detected last time). In FIG. 20, $\Delta T$ handles a change value which is equal to or less than a predetermined value as "0".

Main controller 115 adds a corrected value of notch correcting unit 118 to an operation notch of operation notch setting unit 116, and sends an operation notch signal to driving unit 111. Main controller 115 is provided therein with a clock, and makes temperature reading unit 114 read a detected temperature of temperature detector 106 at regular intervals. Main controller 115 makes temperature correcting unit 109 send a corrected value from temperature-rise storage unit 108, and receives an estimated value of a room temperature from temperature correcting unit 109. Main controller 115 makes temperature correcting unit 109 send a corrected value from temperature-rise storage unit 108, makes operation notch setting unit 116 read an estimated value of the room temperature from temperature correcting unit 109, and determine an operation notch corresponding to the room temperature. Main controller 115 distinguishes, from each other, estimated value Tn of the room temperature obtained by detecting the corrected temperature of temperature correcting unit 109 at regular intervals and estimated value Tn−1 of a room temperature detected last time, and outputs them to operation notch setting unit 116 and notch correcting unit 118.

In the above-described configuration, if main controller 115 receives an instruction to start operation, main controller 115 carries out operations shown from Step 1 to Step 9 in FIG. 18 as shown in the fifth embodiment.

Figure 21:
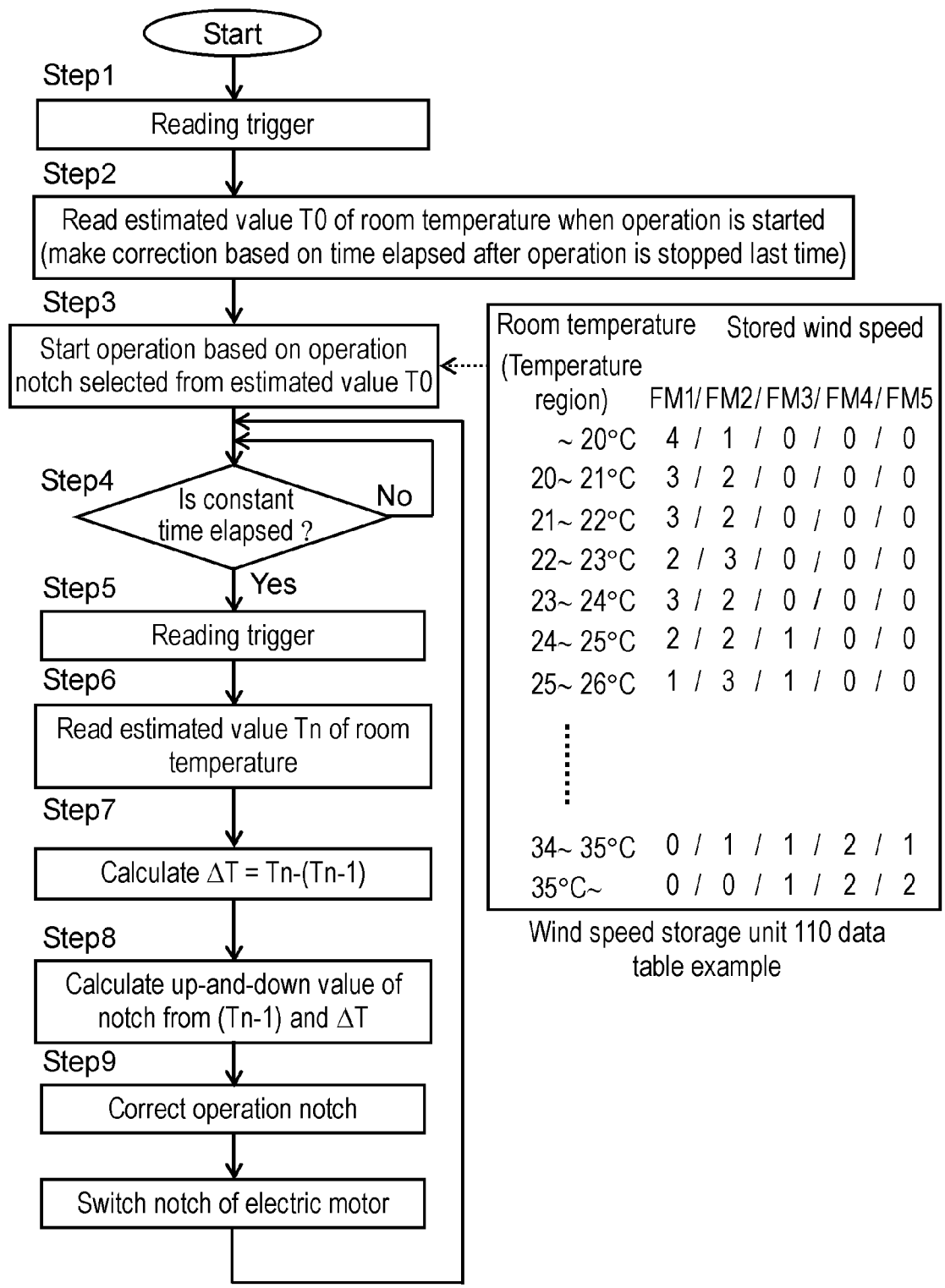
FIG. 21 is a flowchart showing an algorithm of the controller of the ceiling fan.

FIG. 21 is a flowchart showing an algorithm of the controller of the ceiling fan of the sixth embodiment of the present invention. When a user selects the automatic operation, in the sixth embodiment of the present invention, if main controller 115 receives an instruction to start operation at the time of the automatic operation as shown in FIG. 21, a reading trigger signal is output to temperature reading unit 114 as shown in Step 1. A temperature is corrected by time elapsed after the operation is stopped last time by temperature reading unit 114 and temperature-rise storage unit 108 as shown in Step 2, and a detected temperature of temperature detector 106 is read. Temperature correcting unit 109 corrects the detected temperature which is read by temperature reading unit 114 using the corrected value which is sent from temperature-rise storage unit 108 by effect of main controller 115. This corrected detected temperature is read as estimated value T0 of a room temperature when the operation is started, and operation notch setting unit 116 is made to read an operation notch corresponding to the room temperature T0 from wind speed storage unit 110. Main controller 115 makes operation notch setting unit 116 determine an operation notch corresponding to the room temperature, receives the determined operation notch, outputs the same to driving unit 111, and starts operation of electric motor 103 as shown in Step 3.

Figure 22:
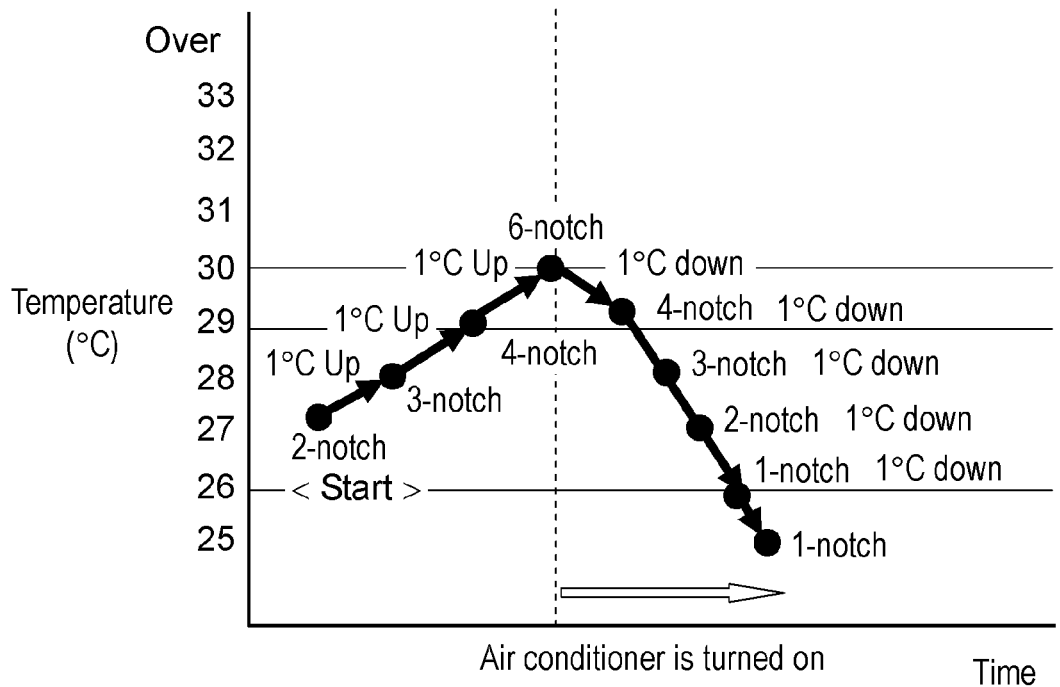
FIG. 22 is a diagram showing an operation example of the ceiling fan.

If constant time in Step 4 is elapsed, the reading trigger signal is again output from main controller 115 to temperature reading unit 114 as shown in Step 5. Similarly, main controller 115 reads estimated value Tn of a room temperature after constant time from temperature correcting unit 109. Estimated value T0 of the room temperature when the operation is started and estimated value Tn of the room temperature after constant time are sent to notch correcting unit 118. Notch correcting unit 118 calculates change value $\Delta T$ as shown in Step 7, and calculates an up-and-down value of notch of electric motor 103 from $\Delta T$ and estimated value T0 of the room temperature at the time of start of operation as shown in Step 8 (in FIG. 21, Tn−1 is used instead of T0. T0 is initial value of Tn−1). The up-and-down value of the notch of electric motor 103 is sent to main controller 115. Main controller 115 adds the up-and-down value of the notch to the current operation notch, and sends a signal to driving unit 111. As a result, driving unit 111 adjusts the operation notch of electric motor 103 in accordance with a change in the room temperature (Step 9). The operation notch of electric motor 103 is adjusted in accordance with the change in the room temperature from the estimated value of the room temperature in the same manner at regular intervals. Notch correcting unit 118 determines an up-and-down value of the notch of electric motor 103 from $\Delta T$ and estimated value Tn−1 of the room temperature. Therefore, as shown in FIG. 22 which is a diagram showing an operation example of the ceiling fan of the sixth embodiment of the present invention, it is possible to adjust the operation notch of the ceiling fan in accordance with the change in the room temperature. It is possible to adjust the rotation of the ceiling fan even if the room temperature is changed with respect to the operation notch which is previously set in operation notch setting unit 116, and a sensible temperature can be maintained within a predetermined width by the wind speed. Especially, even when the room temperature is abruptly lowered as in a case where a cooling switch is turned ON, it is possible to detect a change in the room temperature and the ceiling fan can be operated.

In the sixth embodiment of the present invention, the room temperature is estimated and control is performed such that the operation notch of electric motor 103 is increased or decreased in accordance with change in the room temperature. If temperature detector 106 is provided in the vicinity of a wall in a room and the control of the wind speed of the ceiling fan of the sixth embodiment of the present invention is carried out, it is possible to carry out the adjustment to maintain a sensible temperature of a user within a predetermined width.

In the sixth embodiment of the present invention, the operation notch of electric motor 103 is previously set in operation notch setting unit 116. If the operation notch is set in accordance with a user's preferred sensible temperature, it is possible to provide a ceiling fan which can operate comfortably.

Figure 23:
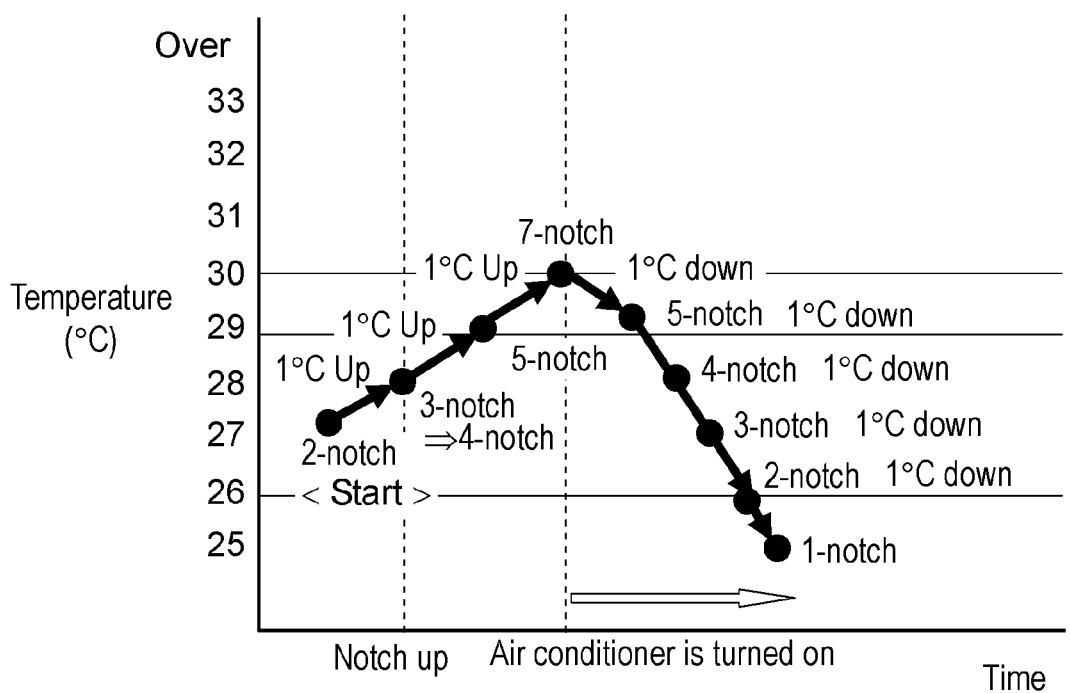
FIG. 23 is a diagram showing an operation example of the ceiling fan when an air quantity is manually changed.

FIG. 23 is a diagram showing an operation example of the ceiling fan when an air quantity is manually changed according to the sixth embodiment of the present invention. When the operation notch is changed during the operation, the operation notch during the operation is slid and an operation notch thereafter should be corrected as shown in FIG. 23.

When the operation is switched to the automatic operation during the manually set operation as shown in FIG. 18, the procedure is started from Step 4 in FIG. 21, and the automatic operation corresponding to a room temperature which is estimated at these intervals can be carried out. On the contrary, when the operation is switched to the manually set operation during the automatically set operation as shown in FIG. 21, if the procedure is shifted to Step 8 in FIG. 18, the manually set operation can smoothly be carried out.

When the manually set operation is shifted to the automatically set operation, the manual setting which is set at these intervals can be used as the initial operation as it is until a temperature is changed to a next temperature region.

In the sixth embodiment of the present invention, the temperature regions are provided as described above, and the number of selection times of the air quantities (FM1 to FM5) which can be set for the temperature regions is stored. Alternatively, a temperature which is used for each air quantity may be stored, and the number of storing times can freely be set.

Seventh Embodiment

Another embodiment of wind speed control of the ceiling fan of the present invention is described. A seventh embodiment of the present invention is different from the sixth embodiment in an estimated value of a reference room temperature. That is, in the sixth embodiment of the present invention, estimated value Tn−1 of a room temperature which is detected last time is subtracted as a reference from estimated value Tn of the latest room temperature, and change value $\Delta T$ is obtained. The seventh embodiment of the present invention is different in that when change value $\Delta T$ exceeds a predetermined value, a new reference value of the estimated value of the subsequent room temperature is used as new reference value Td. In the seventh embodiment of the present invention, the same constituent elements as those in the fourth to sixth embodiments are designated with the same reference numerals and detailed descriptions thereof are omitted.

Figure 24:
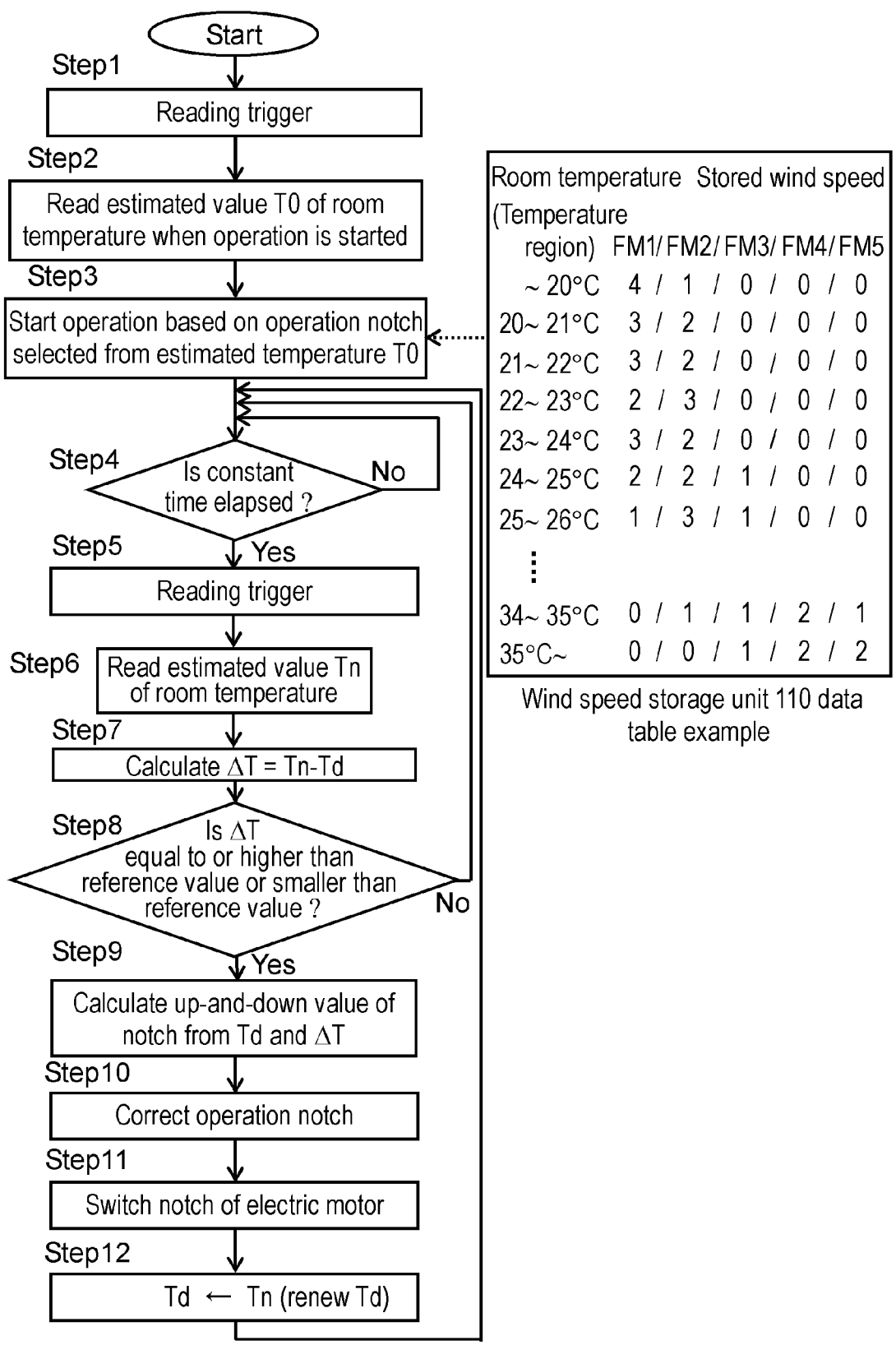
FIG. 24 is a flowchart showing an algorithm of a controller of a ceiling fan according to a seventh embodiment of the present invention.

FIG. 24 is a flowchart showing an algorithm of a controller of the ceiling fan according to the seventh embodiment of the present invention. Notch correcting unit 118 subtracts an already set estimated value (reference value) Td of a room temperature from estimated value Tn of a room temperature which is newly detected in Step 7, and detects change value $\Delta T$ of the room temperature. When change value $\Delta T$ is equal to or higher than a predetermined value, the procedure proceeds from Step 8 to Step 9, and an up-and-down value of a notch of electric motor 103 is calculated from Td and change value ΔT as in the sixth embodiment.

Next, main controller 115 receives the up-and-down value of the notch from notch correcting unit 118, and corrects the operation notch as shown in Step 10. As a result, the operation notch of electric motor 103 is switched as shown in Step 11. Thereafter, estimated value Tn of the latest room temperature is stored (renewed) in main controller 115 as reference value Td (Step 12).

If change value ΔT of the room temperature is smaller than the predetermined value in Step 8, the procedure returns to Step 4, and the procedure waits until constant time is elapsed.

In this way, when change value ΔT becomes equal to or higher than the predetermined value, the operation notch of electric motor 103 is changed. By renewing reference value Td of the room temperature, the room temperature is estimated and control is performed such that the operation notch of electric motor 103 is increased or decreased in accordance with the change thereof. Temperature detector 106 is provided in the vicinity of the wall in the room and the control of the wind speed of the ceiling fan of the seventh embodiment of the present invention is performed. According to this, it is possible to adjust such that the user's sensible temperature is maintained within the predetermined width. According to the seventh embodiment of the present invention, when a room temperature is slowly changed as compared with the sixth embodiment, it is possible to adjust in a manner to follow the operation notch of the ceiling fan in accordance with the change, the sensible temperature can precisely be maintained, and a comfortable space can be created.

If a result of Step 8 in FIG. 24 is No, a destination of regression is between Steps 3 and 4. However, if the destination of regression is set between Steps 4 and 5, change value ΔT becomes equal to or higher than the predetermined value after constant time is elapsed in Step 4, and it is possible to always monitor the same until the operation notch of electric motor 103 is changed.

Although the operation notch is selected from wind speed storage unit 110 by the estimated room temperature T0 in Step 3 in FIG. 24, it is possible to carry out the correction using the data table of wind speed storage unit 110 with respect to correction of the operation notch in Step 10. When Tn−1 is 21° C. and FM1 is selected and Tn is 23° C. in FIG. 24 for example, a change of the operation notch by ΔT and a selected operation notch of wind speed storage unit 110 at 23° C. are compared with each other and the adjustment can be carried out. Here, it is considered that this is the same as a fact that FM1 is selected at 21° C., and if a wind speed which should be selected at 23° C. is FM1, FM2 may not be selected even if there is plus one notch from ΔT, and FM1 may be used as it is. When ΔT is large, since a relative room temperature difference between Tn−1 and Tn is large, it is possible to select a method of giving higher priority to a change of an operation notch by ΔT.

Figure 25:
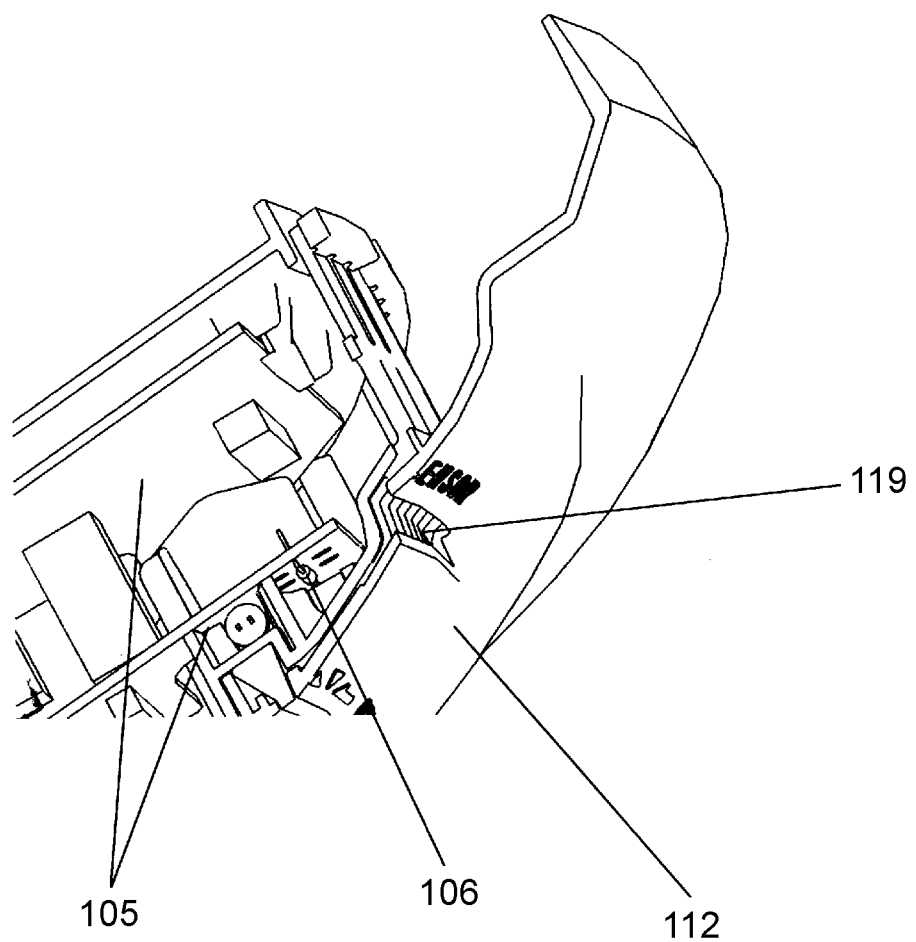
FIG. 25 is a diagram showing configurations of a decoration cap and a temperature detector of the ceiling fan.

In the fourth to sixth embodiments of the present invention, temperature detector 106 is disposed inside of decoration cap 113. FIG. 25 is a diagram showing configuration of a decoration cap and a temperature detector of the ceiling fan of the seventh embodiment of the present invention. As shown in FIG. 25, slits 119 are provided in decoration cap 113 at locations facing temperature detector 106 to enhance ventilation characteristics, and response of temperature detector 106 with respect to a change in the room temperature can be enhanced. If decoration cap 113 is made of metal (aluminum), it becomes easy to detect the change in a room temperature as compared with a case when decoration cap is made of resin, and it is possible to enhance response of temperature detector 106 with respect to a change in a room temperature.

As described above, the ceiling fan of the present invention includes connecting portion 104 fixed to the ceiling, electric motor 103 having the rotation shaft at the lower portion of connecting portion 104, temperature detector 106 which detects a peripheral temperature provided at a lower portion of electric motor 103, and controller 107. Controller 107 stores information of a using status in the manual operation of a user with respect to a room temperature by a room temperature estimated by a temperature detected by temperature detector 106, and determines an operation notch for driving electric motor 103 automatically in accordance with the using status of the user by the room temperature estimated at the time of the automatic operation.

Controller 107 of the ceiling fan of the present invention has a function of storing the operation notch determined by manual setting at regular intervals after the start of operation and a function of storing a temperature detected by temperature detector 106 at these intervals.

Controller 107 of the ceiling fan of the present invention has a function of recognizing a tendency of how the user set an operation notch in a given temperature range based on the stored data of the operation notches and the temperatures.

Further, controller 107 of the ceiling fan of the present invention has a function of selecting one of the operation notches having a high degree of use in the tendency of the user during the automatic operation.

Further, controller 107 of the ceiling fan of the present invention has a function of switching the operation notch to another having the high degree of use in the tendency of the user in accordance with a change in the room temperature from time to time at regular intervals.

Further, controller 107 of the ceiling fan of the present invention has a function of renewing from time to time the stored data of the operation notches in each range of room temperatures every after a lapse of given time in conformance with change in sensitivity of the user.

Further, controller 107 of the ceiling fan of the present invention includes temperature correcting unit 109 for correcting the temperature detected by temperature detector 106 in accordance with time elapsed after the operation is started.

Further, controller 107 of the ceiling fan of the present invention includes temperature correcting unit 109 for correcting the temperature detected by temperature detector 106 in accordance with time elapsed after the operation is stopped.

Further, controller 107 of the ceiling fan of the present invention does not start temperature detection for a predetermined time after the operation is stopped.

Further, controller 107 of the ceiling fan of the present invention has a preset operation notch and notch correcting unit 118 shifting up or down operation notches in a manner to maintain a sensible temperature corresponding to an estimated value of a room temperature when operation is started with the operation notch.

The operation notch of the ceiling fan of the present invention may have a function capable of selecting an operation in an opposite direction for sending wind toward the ceiling in addition to an operation in a normal direction for sending wind downward if need arises.

Eighth Embodiment

Figure 26:
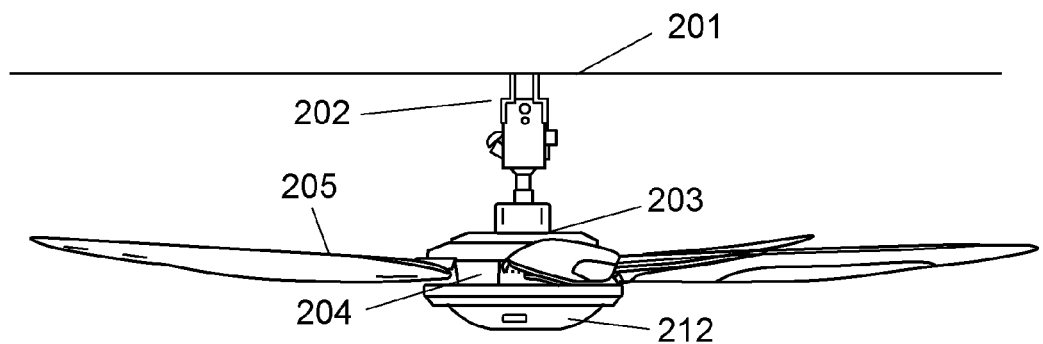
FIG. 26 is an appearance diagram showing a ceiling fan according to an eighth embodiment of the present invention.

FIG. 26 is an appearance diagram showing a ceiling fan according to an eighth embodiment of the present invention.

Figure 27:
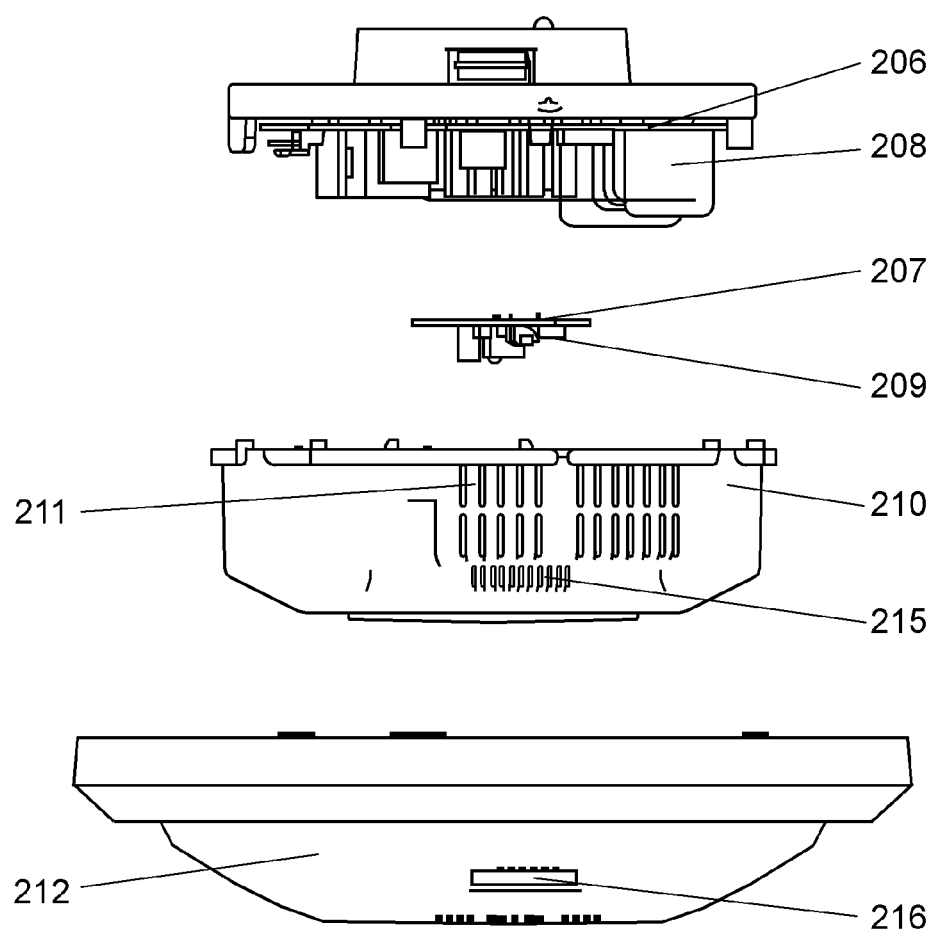
FIG. 27 is a development diagram of an interior of a body cover of the ceiling fan.
Figure 28:
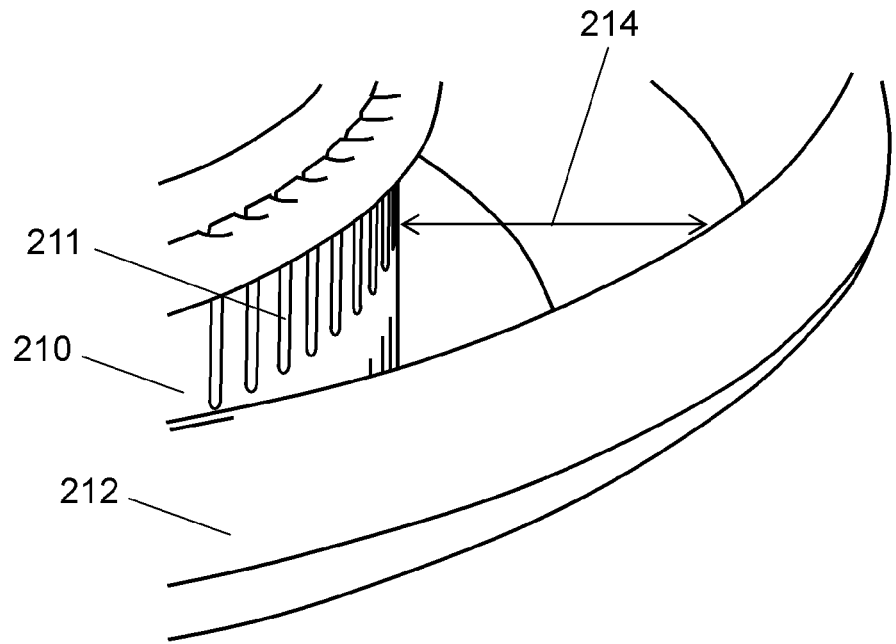
FIG. 28 is a perspective plan view of the body cover of the ceiling fan.
Figure 29:
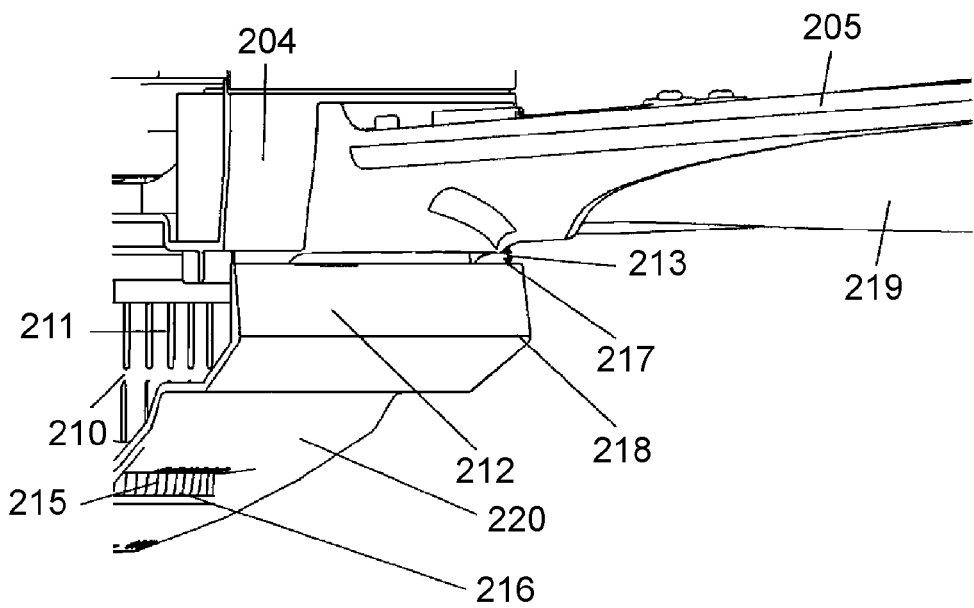
FIG. 29 is a side view and partial sectional view of the ceiling fan.

FIG. 27 is a development diagram of an interior of a body cover of the ceiling fan. FIG. 28 is a perspective plan view of the body cover of the ceiling fan. FIG. 29 is a side view and partial sectional view of the ceiling fan. As shown in FIGS. 26, 27, 28 and 29, the ceiling fan of the eighth embodiment of the present invention includes connecting portion 202 fixed to ceiling 201, electric motor 203 provided on a lower portion of connecting portion 202, and a plurality of fan blades 205 horizontally provided on rotor 204 of electric motor 203.

First circuit substrate 206 is provided on a lower portion of electric motor 203 and second circuit substrate 207 is provided on a lower portion of first circuit substrate 206.

The ceiling fan of the eighth embodiment of the present invention is characterized in that first circuit substrate 206 includes heating portion 208, second circuit substrate 207 includes temperature detector 209 on its lower surface, and temperature detector 209 is provided in a wind passage which is in communication with a room.

More specifically, a cylindrical circuit substrate cover 210 whose lower surface is closed is provided such as to cover first circuit substrate 206 and second circuit substrate 207, and a plurality of vertically long rectangular exhaust ports 211 are formed in a side surface of circuit substrate cover 210. Substantially hemispherical body cover 212 whose upper portion is opened is provided such as to cover circuit substrate cover 210. An upper portion of body cover 212 has electric motor body cover distance 213 at a predetermined distance from electric motor 203, and space 214 is provided between a side inner surface of body cover 212 and exhaust ports 211 of circuit substrate cover 210. A size of electric motor body cover distance 213 is 1 mm to 5 mm for example. Circuit substrate cover 210 has communication port 215 and body cover 212 has suction port 216 so that temperature detector 209 and the room are brought into communication with each other.

If the ceiling fan is operated, heating portion 208 and electric motor 203 are heated, air in circuit substrate cover 210 is heated due to the heat generation, and ascending air current is generated. Heating portion 208 is disposed on first circuit substrate 206, and first circuit substrate 206 is located on an upper portion of second circuit substrate 207 having temperature detector 209. By this ascending air current, air in the room is sucked from suction port 216 of body cover 212 into circuit substrate cover 210 through communication port 215 of circuit substrate cover 210. Air in circuit substrate cover 210 generates air flow which is discharged into the room from upper edge 217 of the body cover through exhaust ports 211 of circuit substrate cover 210.

A temperature of air in the room sucked from suction port 216 of body cover 212 is detected by temperature detector 209, and a rotation speed of the ceiling fan is controlled.

As a result, a temperature of air in the vicinity of the ceiling fan is detected, the rotation speed of the ceiling fan is controlled and therefore, it is possible to enhance a usability when the rotation speed of the ceiling fan is changed in accordance with a room temperature.

Upper outer periphery 218 of body cover 212 is disposed closer to an inner side than twisted portion 219 of fan blades 205. More specifically, upper outer periphery 218 of substantially hemispherical body cover 212 whose upper portion is opened is separated from electric motor 203 and electric motor body cover distance 213. Upper outer periphery 218 is disposed closer to an inner side than twisted portion 219 of the plurality of fan blades 205 fixed to rotor 204 of electric motor 203. As a result, fan blades 205 rotate, and air sent downward by twisted portion 219 of fan blades 205 flows outside of body cover 212.

That is, air is not sent to the space provided with predetermined electric motor body cover distance 213 between upper outer periphery 218 of body cover 212 and electric motor 203, and air flows outside of body cover 212. That is, air in the room is sucked from suction port 216 of body cover 212 into circuit substrate cover 210 through communication port 215 of circuit substrate cover 210. The sucked air in circuit substrate cover 210 does not disturb a flow of air discharged into the room from upper edge 217 of body cover 212 through exhaust ports 211 of circuit substrate cover 210. Hence, it is possible to suppress a disturbance of air flow in temperature detector 209, and to enhance the usability when the rotation speed of the ceiling fan is changed in accordance with a room temperature.

Suction port 216 of body cover 212 is located at an inclined surface or spherical portion 220 of body cover 212. More specifically, suction port 216 of body cover 212 is located at the inclined surface or spherical portion 220 at an outer peripheral surface of a hemispherical body cover whose upper portion is opened, and suction port 216 has a substantially laterally long rectangular shape.

That is, air which is sent downward from twisted portion 219 of fan blades 205 flows outside of body cover 212, and this air flows from suction port 216 of body cover 212 into temperature detector 209 in circuit substrate cover 210 along an outer peripheral surface of body cover 212. Hence, it is possible to precisely detect a temperature of air in the vicinity of the ceiling fan, and to enhance the usability when the rotation speed of the ceiling fan is changed in accordance with a room temperature.

Figure 30:
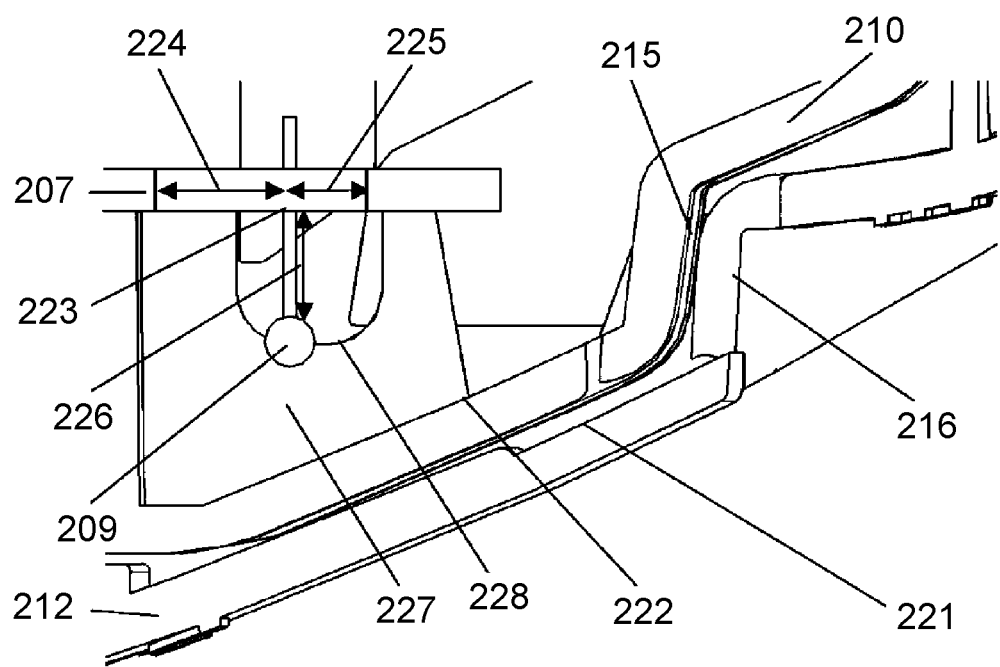
FIG. 30 is a sectional view of the ceiling fan.

FIG. 30 is a sectional view of the ceiling fan of the eighth embodiment of the present invention. Suction port 216 of body cover 212 is provided in the horizontal direction at a location facing temperature detector 209 of second circuit substrate 207. More specifically, suction port 216 of body cover 212 and communication port 215 of circuit substrate cover 210 are located in a state where they are substantially in contact with each other, and both of them have substantially the same laterally long rectangular shapes. Temperature detector 209 of second circuit substrate 207 is provided in the horizontal direction at a location facing suction port 216 of body cover 212 and in the vicinity of communication port 215 of circuit substrate cover 210.

According to this, air sucked from suction port 216 of body cover 212 flows into temperature detector 209 of second circuit substrate 207 through suction port 216 of body cover 212 and communication port 215 of circuit substrate cover 210. Hence, it is possible to precisely detect a temperature of air in the vicinity of the ceiling fan, and to enhance the usability when the rotation speed of the ceiling fan is changed in accordance with a room temperature.

Inclined portion 222 provided inside body cover 212, inclined portion 222 inclining downwardly from the same height as a lower end of suction port 216. More specifically, suction port 216 of body cover 212 and communication port 215 of circuit substrate cover 210 are located in a state where they are substantially in contact with each other, and both of them have substantially the same laterally long rectangular shapes. Suction port 216 of body cover 212 and a lower end of communication port 215 of circuit substrate cover 210 are located substantially at the same heights. Inclined portion 222 of a lower surface of circuit substrate cover 210 inclining downwardly from the same height as the lower end.

According to this, air which flows into circuit substrate cover 210 from suction port 216 of body cover 212 and communication port 215 of circuit substrate cover 210 flows through a space whose upper and lower surfaces are sandwiched by second circuit substrate 207 having temperature detector 209 and inclined portion 222, and passes through temperature detector 209. That is, the upper and lower surfaces become upper and lower guiding surfaces by second circuit substrate 207 having temperature detector 209 and inclined portion 222 which is a lower surface of circuit substrate cover 210, and a flow of air into temperature detector 209 can be smoothened.

Figure 31:
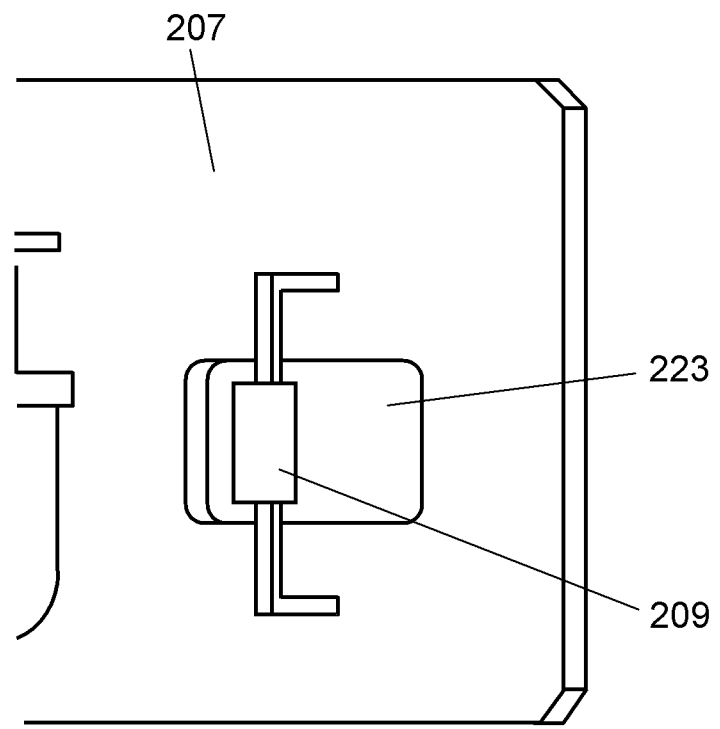
FIG. 31 is an enlarged view of a second circuit substrate of the ceiling fan as viewed from below.

FIG. 31 is an enlarged view of a second circuit substrate of the ceiling fan of the eighth embodiment of the present invention as viewed from below. Second circuit substrate 207 is provided with a hole 223 in a location directly above temperature detector 209. More specifically, hole 223 is formed in second circuit substrate 207 at the location directly above temperature detector 209, and a lower portion of second circuit substrate 207 and a lower portion of first circuit substrate 206 which is an upper portion of second circuit substrate 207 are brought into communication with each other through the hole 223.

According to this, air which flows into circuit substrate cover 210 through suction port 216 of body cover 212 and communication port 215 of circuit substrate cover 210 flows through a space whose upper and lower surfaces are sandwiched by second circuit substrate 207 having temperature detector 209 and inclined portion 222. The air passes through temperature detector 209, flows into second circuit substrate 207, and flows into a lower portion of first circuit substrate 206 from hole 223 or from a periphery of second circuit substrate 207. Further, the air flows around a periphery of first circuit substrate 206, and the air generates a flow of air discharged into the room from upper edge 217 of body cover 212 through exhaust ports 211 of circuit substrate cover 210.

That is, since second circuit substrate 207 is provided with hole 223 in the location directly above temperature detector 209, the flow from a lower portion of second circuit substrate 207 to a lower portion of first circuit substrate 206 can be smoothened.

Hole 223 has a substantially laterally long rectangular shape, and its longitudinal direction is in line with a direction extending from an outer periphery of body cover 212 toward the center thereof. More specifically, hole 223 has the substantially laterally long rectangular, and the direction extending from the outer periphery of body cover 212 toward the center thereof is the substantially laterally long rectangular longitudinal direction. This substantially laterally long rectangular longitudinal direction is the same as a flowing direction of air which flows into circuit substrate cover 210 through suction port 216 of body cover 212 and communication port 215 of circuit substrate cover 210. A size of the substantially laterally long rectangular lateral direction is substantially the same as a size of a length of a temperature sensor which is temperature detector 209.

According to this, air which flows into circuit substrate cover 210 through suction port 216 and communication port 215 flows through a space whose upper and lower surfaces are sandwiched between second circuit substrate 207 and inclined portion 222, and passes through temperature detector 209. The air flows into a lower portion of first circuit substrate 206 from hole 223 or a periphery of second circuit substrate 207. The air flows along a periphery of first circuit substrate 206, and generates a flow of air which is discharged into the room from upper edge 217 of body cover 212 through exhaust ports 211 of circuit substrate cover 210.

Second circuit substrate 207 has substantially laterally long rectangular shaped hole 223, and the longitudinal direction of hole 223 is the same as the flowing direction of air which flows into circuit substrate cover 210 through suction port 216 of body cover 212 and communication port 215 of circuit substrate cover 210. Therefore, air which passes through temperature detector 209 flows along the longitudinal direction of hole 223, and gradually flows toward the lower portion of first circuit substrate 206 from hole 223. According to this, it is possible to smoothen the flow of air which flows from the lower portion of second circuit substrate 207 toward the lower portion of first circuit substrate 206.

Center side distance 224 is longer than outer-peripheral side distance 225. Center side distance 224 is a distance from temperature detector 209 to a center side end which is an end of hole 223 in a central direction from temperature detector 209. Outer-peripheral side distance 225 is a distance from temperature detector 209 to an outer peripheral side end which is an end of hole 223 in the outer peripheral direction. That is, substantially laterally long rectangular hole 223 in the central direction is longer than a hole in the outer peripheral direction from temperature detector 209.

According to this, after air passes through temperature detector 209, the air flows along the longitudinal direction of hole 223 of second circuit substrate 207, and gradually flows toward the lower portion of first circuit substrate 206 from hole 223. According to this, after the air passes through temperature detector 209, the flow of air from the lower portion of second circuit substrate 207 toward the lower portion of first circuit substrate 206 is smoothened.

Temperature detector 209 includes second circuit substrate 207 and temperature detecting substrate distance 226. More specifically, temperature detector 209 is provided substantially at an intermediate portion of a space whose upper and lower surfaces are sandwiched between second circuit substrate 207 having temperature detector 209 and inclined portion 222 which is a lower surface of circuit substrate cover 210.

According to this, air which flows into circuit substrate cover 210 through suction port 216 and communication port 215 flows through the space whose upper and lower surfaces are sandwiched between second circuit substrate 207 and inclined portion 222, and passes through temperature detector 209 provided at substantially the intermediate portion of the space. That is, the upper and lower surfaces become upper and lower guiding surfaces by second circuit substrate 207 having temperature detector 209 and inclined portion 222 which is a lower surface of circuit substrate cover 210, and a flow of air into temperature detector 209 can be smoothened. Since temperature detector 209 is further separated from first circuit substrate 206 having heating portion 208, it is possible to suppress the influence of heat of first circuit substrate 206.

Figure 32:
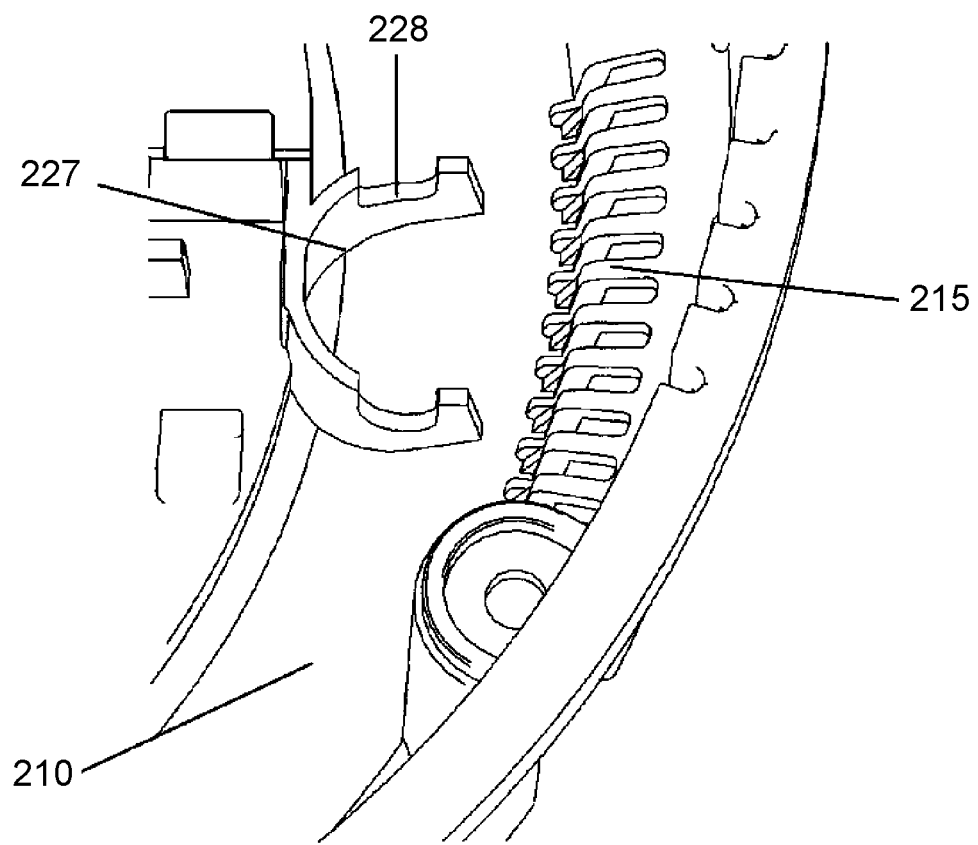
FIG. 32 is a perspective plan view of a circuit substrate cover of the ceiling fan.

FIG. 32 is a perspective plan view of the circuit substrate cover of the ceiling fan of the eighth embodiment of the present invention. Wall portion 227 whose portion on the side of communication port 215 of circuit substrate cover 210 is opened is provided in body cover 212 in a manner to surround temperature detector 209 of second circuit substrate 207. More specifically, wall portion 227 has a U-shaped cross section whose portion on the side of communication port 215 of circuit substrate cover 210 is opened such as to surround temperature detector 209 of second circuit substrate 207.

That is, the space whose upper and lower surfaces are sandwiched by second circuit substrate 207 and inclined portion 222, temperature detector 209 and hole 223 are surrounded by wall portion 227 whose portion on the side of communication port 215 extending upward from an upper surface of inclined portion 222 is opened toward the space. An upper surface of wall portion 227 having a U-shaped cross section is in contact with a lower surface of second circuit substrate 207.

According to this, air which flows into circuit substrate cover 210 through suction port 216 and communication port 215 flows through a space whose upper and lower surfaces are surrounded by second circuit substrate 207 and inclined portion 222 and whose left and right surfaces are surrounded by wall portion 227. That is, the air which flows into circuit substrate cover 210 through suction port 216 and communication port 215 flows through the space whose upper, lower, left and right surfaces are surrounded, and passes through temperature detector 209 provided substantially at an intermediate portion of the space. Since the air flows from the lower portion of second circuit substrate 207 toward the lower portion of first circuit substrate 206 through hole 223, a flow of air from the lower portion of second circuit substrate 207 toward the lower portion of first circuit substrate 206 can be smoothened.

Notch 228 is provided in a side wall portion to which wall portion 227 having a U-shaped cross section is opposed. More specifically, substantially rectangular notch 228 whose upper surface is opened is formed at a location facing temperature detector 209 in the side wall portion to which wall portion 227 having the U-shaped cross section is opposed, i.e., wall portion 227 is arranged in parallel to the wall portion.

According to this, air which flows into circuit substrate cover 210 through suction port 216 and communication port 215 flows through the space whose upper, lower, left and right surfaces are surrounded, and passes through temperature detector 209 provided substantially at an intermediate portion of the space. Since the air flows from the lower portion of second circuit substrate 207 toward the lower portion of first circuit substrate 206 through hole 223 and notch 228, the flow of air from the lower portion of second circuit substrate 207 toward the lower portion of first circuit substrate 206 can be smoothened.

As described above, the ceiling fan of the present invention includes connecting portion 202 fixed to the ceiling, electric motor 203 provided on the lower portion of connecting portion 202, and rotor 204 of electric motor 203 includes the plurality of horizontal fan blades 205. First circuit substrate 206 is provided on the lower portion of electric motor 203, and second circuit substrate 207 is provided on the lower portion of first circuit substrate 206. Body cover 212 is provided at a predetermined distance from electric motor 203 in a manner to cover first circuit substrate 206 and second circuit substrate 207, and heating portion 208 is provided on first circuit substrate 206. Temperature detector 209 is provided on a lower surface of second circuit substrate 207, and suction port 216 is provided in body cover 212 in flow communication between temperature detector 209 and the room interior.

Upper outer periphery 218 of body cover 212 of the ceiling fan of the present invention is located inward away from twisted portion 219 of fan blades 205.

Suction port 216 of the ceiling fan of the present invention is located at the inclined surface of body cover 212 or spherical portion 220.

Suction port 216 of the ceiling fan of the present invention is provided in the horizontal direction at a location facing temperature detector 209.

Inclined portion 222 provided inside body cover 212, inclined portion 222 inclining downwardly from the same height as the lower end of suction port 216 of the ceiling fan of the present invention.

Hole 223 is formed in second circuit substrate 207 directly above temperature detector 209 of the ceiling fan of the present invention.

Hole 223 of the ceiling fan of the present invention has a laterally long rectangular shape, and a longitudinal direction of hole 223 is in line with a direction extending from an outer periphery of body cover 212 toward the center thereof.

Temperature detector 209 of the ceiling fan of the present invention has a predetermined distance from second circuit substrate 207.

Wall portion 227 is provided inside body cover 212 of the ceiling fan of the present invention in a manner to surround temperature detector 209, wall portion 227 having an opening at one side facing suction port 216.

Wall portion 227 of the ceiling fan of the present invention has a U-shaped cross section surrounding temperature detector 209 with the opening at the side facing suction port 216.

Wall portion 227 is provided with notch 228 in any of confronting side wall portions of the ceiling fan of the present invention.

INDUSTRIAL APPLICABILITY

The present invention is extremely useful as a ceiling fan which controls operation based on a room temperature.

REFERENCE MARKS IN THE DRAWINGS

1, 101: Ceiling fan body
2, 102, 205: Fan blade
3, 103, 203: Electric motor
3A, 204: Rotor
4, 104, 202: Connecting portion
5, 105: Control substrate
6, 106: Temperature detector
7, 107: Controller
8, 108: Temperature-rise storage unit
9, 109: Temperature correcting unit
10, 111: Driving unit
11, 112: Upper cover
12, 113: Decoration cap
13, 114: Temperature reading unit
14, 115: Main controller
15, 116: Operation notch setting unit
16, 118: Notch correcting unit
17, 119: Slits
110: Wind speed storage unit
201: Ceiling
206: First circuit substrate
207: Second circuit substrate
208: Heating portion
209: Temperature detector
210: Circuit substrate cover
211: Exhaust ports
212: Body cover
213: Electric motor body cover distance
214: Space
215: Communication port
216: Suction port
217: Upper edge
218: Upper outer periphery
219: Twisted portion
220: Spherical portion
221: Curved portion
222: Inclined portion
223: Hole
224: Center side distance
225: Outer peripheral side distance
226: Temperature detecting substrate distance
227: Wall portion
228: Notch

The invention claimed is:

1. A ceiling fan comprising:
a connecting portion fixed to a ceiling;
an electric motor including a rotation shaft, the rotation shaft connected to a lower portion of the connecting portion;
a control substrate disposed under the electric motor;
a temperature detector provided on the control substrate, the temperature detector detecting a peripheral temperature near an outer periphery of the electric motor; and
a controller disposed on the control substrate,
wherein a memory in the controller stores a temperature rise data at a time of operation of the electric motor, the temperature rise data associated with influence of heat from the electric motor,
wherein the controller is configured to estimate room temperature by correcting a temperature detected by the temperature detector based upon the temperature rise data,
wherein the controller is further configured to control the electric motor according to the estimated room temperature, and
wherein the controller is further configured to correct the temperature detected by the temperature detector in accordance with time elapsed after operation is started.

2. A ceiling fan comprising:
a connecting portion fixed to a ceiling;
an electric motor including a rotation shaft, the rotation shaft connected to a lower portion of the connecting portion;
a control substrate disposed under the electric motor;
a temperature detector provided on the control substrate, the temperature detector detecting a peripheral temperature near an outer periphery of the electric motor; and
a controller disposed on the control substrate,
wherein a memory in the controller stores a temperature rise data at a time of operation of the electric motor, the temperature rise data associated with influence of heat from the electric motor,
wherein the controller is configured to estimate room temperature by correcting a temperature detected by the temperature detector based upon the temperature rise data,
wherein the controller is further configured to control the electric motor according to the estimated room temperature, and
wherein the controller is further configured to correct the temperature detected by the temperature detector in accordance with time elapsed after operation is stopped.

3. A ceiling fan comprising:
a connecting portion fixed to a ceiling;
an electric motor including a rotation shaft, the rotation shaft connected to a lower portion of the connecting portion;
a control substrate disposed under the electric motor;
a temperature detector provided on the control substrate, the temperature detector detecting a peripheral temperature near an outer periphery of the electric motor; and
a controller disposed on the control substrate,
wherein a memory in the controller stores a temperature rise data at a time of operation of the electric motor, the temperature rise data associated with influence of heat from the electric motor,
wherein the controller is configured to estimate room temperature by correcting a temperature detected by the temperature detector based upon the temperature rise data,
wherein the controller is further configured to control the electric motor according to the estimated room temperature, and
wherein the controller is further configured to detect the temperature by the temperature detector to estimate the room temperature after predetermined time is elapsed after operation is stopped.

4. The ceiling fan according to claim 1, wherein the controller is further configured to compare estimated values of the room temperature detected at regular time intervals, and shift up or down operation notches for the electric motor based on a change in the estimated values.

5. The ceiling fan according to claim 4, wherein the controller is further configured to determine one of the operation notches to be switched for the electric motor when the estimated value of the room temperature changes to an extent equal to or greater than a predetermined degree.

6. The ceiling fan according to claim 4, wherein the controller is further configured to shift up or down the operation notches in a manner to maintain a sensible temperature corresponding to the estimated value of the room temperature when the operation notch is in a preset position and operation of the electric motor is started at that position.

* * * * *